United States Patent
Kamata et al.

(10) Patent No.: US 8,027,225 B2
(45) Date of Patent: Sep. 27, 2011

(54) METHODS AND SYSTEMS FOR SEISMIC SENSORS

(75) Inventors: Masahiro Kamata, Kasawaki (JP); Francis Maissant, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/044,552

(22) Filed: Mar. 10, 2011

(65) Prior Publication Data

US 2011/0194375 A1 Aug. 11, 2011

Related U.S. Application Data

(62) Division of application No. 12/180,560, filed on Jul. 27, 2008, now Pat. No. 7,929,379.

(51) Int. Cl.
*H04R 9/02* (2006.01)
(52) U.S. Cl. .......... 367/182; 367/13; 367/164; 367/183
(58) Field of Classification Search .................. 367/13, 367/164, 182, 183
See application file for complete search history.

(56) References Cited

U.S. PATENT DOCUMENTS

| | | | | |
|---|---|---|---|---|
| 3,738,445 A | * | 6/1973 | Wilson et al. | 367/183 |
| 4,285,054 A | * | 8/1981 | McNeel | 367/183 |
| 7,225,662 B2 | * | 6/2007 | Kamata | 367/13 |
| 7,406,002 B2 | * | 7/2008 | Schleisiek et al. | 367/182 |

FOREIGN PATENT DOCUMENTS

WO  WO 03/096071 A1 * 11/2003

OTHER PUBLICATIONS

Masahiro Kamata, "An accelerometer for seismic signal detection", 6th Conf. of Underground and Civil Engineering Acoustic Emission, Japan, Tohoku University, Aug. 1999.*

Masahiro Kamata, "High Precision Geophone Calibration", the Japanese Society for Non-Destructive Inspection, 17th Inetrnational Acoustic Emission Symposium, Tokyo, Japan, Nov. 2004.*

* cited by examiner

*Primary Examiner* — Ian Lobo
(74) *Attorney, Agent, or Firm* — Daryl Wright; Jody DeStefanis; Jeff Griffin

(57) ABSTRACT

Methods and systems for determining coil eccentricity of seismic sensors configured or designed for use in seismic signal detection. A direct electrical current is applied to a moving coil of a seismic sensor such that the moving coil is dislocated from a neutral position relative to the magnetic field in the seismic sensor. A predetermined indicator is measured and eccentricity of the coil ($\delta$) relative to the center of the magnetic filed is determined using the predetermined indicator.

6 Claims, 17 Drawing Sheets

Land Seismic

Land Seismic

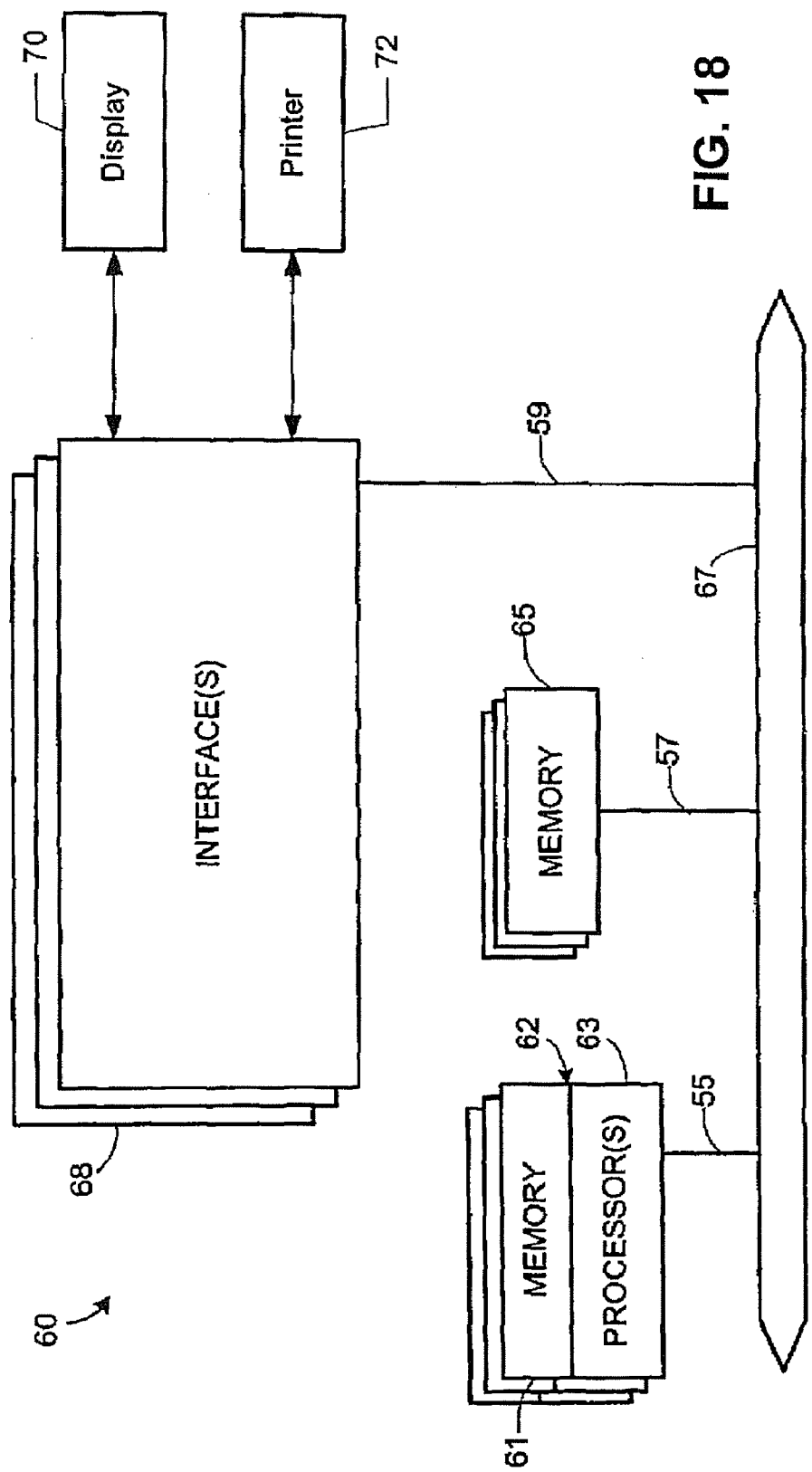

METHODS AND SYSTEMS FOR SEISMIC SENSORS

RELATED APPLICATIONS

This is a divisional application of currently co-pending U.S. patent application Ser. No. 12/180,560, filed Jul. 27, 2008, the contents of which are herein incorporated by reference.

TECHNICAL FIELD

The present invention relates to devices for sensing vibrations in earth formations. More specifically, the present disclosure is directed to electrodynamic sensing devices, such as geophones and seismometers, that have a moving coil placed in a magnetic field in a centered position. The present disclosure may be applicable to other types of vibration transducers, either in sensing or transmitting operation.

BACKGROUND

In the oil and gas industry seismic sensors are deployed at various locations, such as on the earth surface, in the sea, at the seabed, or in a borehole, to provide operationally significant subsurface structural and material information by measuring seismic signals reflected from changes in the subsurface structures. In this, seismic sensors are commonly used for purposes of obtaining useful data relating to acoustic impedance contrasts in subsurface structures.

In seismic signal detection, the vibrations in the earth resulting from a source of seismic energy are sensed at discrete locations by sensors, and the output of the sensors used to determine the structure of the underground formations. The source of seismic energy can be natural, such as earthquakes and other tectonic activity, subsidence, volcanic activity or the like, or man-made such as acoustic signals from surface or underground operations, or from deliberate operation of seismic sources at the surface or underground. For example, the sensed seismic signals may be direct signals that are derived from micro-seismicity induced by fracturing or reservoir collapse or alteration, or reflected signals that are derived from an artificial source of energy. Sensors fall into two main categories; hydrophones which sense the pressure field resulting from a seismic source, or geophones which sense vibration arising from a seismic source.

Typically, geophones are sensitive to vibrations of low or very low frequency. As depicted in FIG. 1B, a typical geophone 10 has one or more cylindrical moving coil 12 that is suspended by springs 20, 22 so as to be disposed around a magnet 15 having pole pieces 16, 18. The geophone 10 has a housing 24 and end caps 26. Each moving coil 12 is maintained at a neutral, rest position by the springs 20, 22, and is free to oscillate in a magnetic field of the magnet 15 from a centered position thereof. Springs 20, 22 are designed to maintain the coil 12 at a centered, equilibrium position relative to the magnetic field of the magnet 15. Note again FIG. 1B.

When the earth moves due to the seismic energy propagating either directly from the source or via an underground reflector, the geophone, which can be located at the earth's surface, in the sea or at the seabed, or on the wall of a borehole which penetrates the earth, moves with the particle motion caused by acoustic wave propagation. If the axis of the geophone is aligned with the direction of motion, however, the moving coil mounted on the spring inside the geophone stays in the same position causing relative motion of the coil with respect to the housing. When the coil moves in the magnetic field, a voltage is induced in the coil which can be output as a signal.

If the geophone is tilted, i.e., is moved away from the orientation that it is designed for, the moving coil is eccentered with respect to the magnetic field in the magnet. Note FIG. 1C. For example, as depicted in FIG. 1A, typically vertical geophones are used in land seismic survey operations. The spring to support the moving coil is pre-stressed to compensate for gravitational force so that the moving coil is centered in the geophone. However, the geophones are manually planted in the ground and may not be vertical. If such a geophone is tilted, the pre-stressed spring causes the moving coil to move in the upward direction relative to the neutral position of the coil in the vertical position of the geophone, as depicted in FIG. 1C. The neutral or rest position of the moving coil is designated in FIG. 1C as $x_0$, and the displaced position due to tilt $\theta$ is designated as x. Eventually, if the amount of tilt is large, the moving coil hits an end cap of the geophone so that the geophone is no longer able to respond to the seismic vibrations.

Although FIG. 1A depicts exemplary land seismic with typical vertical geophones, it is also possible to use three-component geophones of the type discussed herein in connection with seabed and borehole seismic.

FIG. 1D illustrates graphically the relationships between tilt of a 10 Hz vertical geophone and the geophone response parameters $S_o$, $D_o$, and $f_o$ using measured data. In this, as evident from FIG. 1D, if a vertical geophone is tilted from its vertical position the geophone response parameters $S_o$, $D_o$, and $f_o$ change based on the amount of tilt.

In land seismic survey operations, seismic data are processed by assuming that all the geophones that are planted on the land surface are vertical. If seismic waves propagate in the upward direction, a tilted geophone will output signal that is altered due to tilt and reduced by an amount equal to $\cos(\theta)$, where $\theta$ is measured from vertical—note FIG. 1C. As consequence, incorrect orientation of the geophones can cause misinterpretation of the formation properties, by changing the apparent amplitude of reflected waves.

In seabed seismic survey operations, an ocean bottom cable (OBC) is deployed from a boat to the seabed. Note FIGS. 2A and 2B. Seismic sensors are mounted on the side of the cable. After the cable is deployed in the sea, the orientation of the sensors may be horizontal, vertical or upside down. Gimbaled mountings may be used so that a sensor is always vertically oriented irrespective of how the sensor is deployed. Recently, three-component omni-tiltable geophones have been used in sensor packages with a tiltmeter or inclinometer. By knowing the orientation of the mounting of the three-component geophone, it is possible to rotate the axis of the seismic measurements. Ideally, a magnetometer may be employed to know the horizontal orientation of the sensor package so as to transpose the detected seismic signals in the physical earth coordinates to determine from which direction the seismic signals arrive at the seismic sensors.

In a borehole seismic survey, one or more geophone is deployed downhole in a borehole. Note FIGS. 3A and 3B. The trajectory of the borehole is usually known by independent measurement. If the length of the deploying cable is known, i.e., the along depth, it is possible to determine orientation and position of the downhole sensor package, i.e., azimuth, inclination, depth and horizontal departure from the well head. The information missing is the relative bearing of the sensor package. As used herein, "relative bearing" refers to the angle of sensor package orientation. The sensor package or sound is typically cylindrical and may rotate in the borehole, and the orientation of the two horizontal geophones will not be known. To identify the sensor orientation, it may be possible to deploy such downhole geophones with a gyroscope. Alternatively, a tiltmeter or inclinometer may be integrated with the downhole geophones to determine relative geophone bearing against the direction of gravity.

In addition to the issues discussed above, others arise during manufacturing and assembly of geophones. In this, during manufacture the geophone moving coil may not be properly centered around the magnetic field in the magnet. After assembly, it is not possible to see whether or not the moving coil is properly centered around the magnet so as to be at its desired neutral rest position.

Displacement of the moving coil from its neutral rest position during assembly of the geophone may lead to changes in the geophone response parameters and increase in harmonic distortion. The offset of the coil reduces the dynamic range of the geophone. In a worst case, the geophone moving coil may hit the top or the bottom of the housing and therefore not respond to seismic signals that are received by the geophone. In particular, a properly centered moving coil is highly important for low frequency geophones, such as seismometers, since the acceptable operating tilt range for such geophones is small, i.e., in the order of a few degrees. Such low frequency geophones or seismometers often use a built-in carpenter's level or eye bubble to guide installation of the devices; however, such eye bubble levels show only the tilt angle of the geophone or seismometer housing relative to gravity, but do not show the eccentricity of the moving coil without a built-in displacement sensor inside the geophone or seismometer.

As previously mentioned, in the past, gimbaled geophones have been employed to avoid tilt in the geophone. However, gimbaled geophones tend to be bulky and are more expensive due to the additional hardware that is required for the gimbaled structure. Geophones with tiltmeters and other tilt determining sensors are known in the art, but require additional hardware and are difficult to fit in the limited space that is typically available in seismic surveying operations. In addition, extra wiring is required for electrical connection. Since a geophone type device is a passive sensor, only a twisted wire cable is required to connect the geophone to a data acquisition system. Typically, in land, seabed, or borehole seismic acquisition operations many geophones are connected using multi-twisted pair cables. Extra wiring for built-in tilt sensors means that additional conductors must be added to the cables thereby increasing cable weight and cost, and the maintenance costs for the cables. In addition, larger connectors are required which poses a reliability issue. For seabed and borehole operations, any additional connectors or connections to the cable are perceived as unreliable due to a tendency to leak. Therefore, increased wiring is not a preferred approach in seismic operations.

For single seismic sensors having tilt accelerometers, the electronics may be located away from the sensors causing alignment errors between the seismic sensors and the tilt accelerometers. Such errors are difficult to control making the use of such configurations problematic.

Accordingly, it will be appreciated that there exists a desire to improve upon conventional methods and systems that use geophones in order to improve the accuracy of seismic measurements.

The limitations of conventional seismic sensor designs noted in the preceding are not intended to be exhaustive but rather are among many which may tend to reduce the effectiveness of previously known sensor mechanisms in field operation. The above should be sufficient, however, to demonstrate that sensor structures existing in the past will admit to worthwhile improvement.

SUMMARY

Embodiments disclosed herein provide methods and systems for seismic sensors, such as geophones and seismometers. In particular, some embodiments of the present disclosure provide methods and systems for determining eccentricity ($\delta$) of a moving coil of a seismic sensor that is designed or configured for seismic signal detection.

In certain embodiments herein, the techniques of the present disclosure may be utilized for determining tilt of a geophone, for example, a geophone that is planted in the ground for land seismic. In yet other embodiments herein, quality control (QC) of geophones planted in the ground may be performed based on the determined eccentricity of the moving coils of the geophones to see if the geophones are vertically planted within the tolerance for seismic signal acquisition by use of the geophones. In such a situation, it would be possible to inform the person or persons who planted the geophones to replant them so that the geophones are properly planted in the ground for purposes of land seismic survey. The present disclosure contemplates that the person or persons who planted the geophones may perform the test to make sure that the geophones are properly planted. Such QC information may be provided to a client as evidence of the quality of the geophone planting operation. QC information of this type provides a unique answer product/service that could be of high value to a client.

In yet other embodiments herein, relative bearing of a seismic sensor package deployed in a borehole or at a surface of a seabed may be determined based on the tilt of the geophone(s) in the sensor package.

In yet other embodiments herein, eccentricity of the moving coil may be utilized for purposes of adjusting assembly parameters for geophones, such as adjusting an assembly jig, so that the moving coils of the geophones are properly centered in the magnetic fields during manufacturing. By measuring the eccentricity of the moving coils of the geophones after fabrication, poorly assembled geophones may be rejected and only the correctly assembled geophones provided to the customer thereby eliminating defective/improperly functioning geophones during the manufacturing process. As a further aspect of the present disclosure, adjustment mechanisms and techniques are provided to adjust a moving coil of a geophone to compensate for or correct geophone coil eccentricity. Such mechanisms may be installed in geophones so that coil eccentricity may be easily corrected on an as needed basis.

In further embodiments disclosed herein, an alternating electrical current is superimposed on a direct electrical current applied to the moving coil of a geophone; the applied direct electrical current is changed such that the moving coil hits either the top or the bottom cap; and a top or bottom of the geophone housing is determined based on the level of the direct electrical current at which distortion due to the moving coil collision appears in the sinusoidal current. It may also be possible to hear the sound of the coil hitting the top or bottom end cap of the geophone. Furthermore, electrical circuitry may be provided in the geophone so that contact between the moving coil and the end caps of the geophone causes an electrical leakage that is monitored. One or more geophone assembly parameter may be adjusted to correct the coil eccentricity.

In some embodiments of the present disclosure, a method for determining coil eccentricity of a seismic sensor configured or designed for use in seismic signal detection comprises applying to a moving coil of the seismic sensor a direct electrical current such that the moving coil is dislocated from a neutral position relative to a magnetic field in the seismic sensor; monitoring a predetermined indicator relative to the dislocation of the coil from the neutral position; and determining eccentricity of the coil ($\delta$) relative to the center of the magnetic field using the predetermined indicator. In some aspects disclosed herein, the method further comprises performing a step test after dislocating the moving coil from the neutral position. The seismic sensor may be vertically oriented and the step test may be performed by releasing the coil from an upward position relative to the neutral position; releasing the coil from a downward position relative to the neutral position; or releasing the coil from both an upward position and a downward position relative to the neutral position, and combining the results.

The step test may be performed during quality control (QC) activities. In some aspects the method includes releasing the direct electrical current applied to the moving coil of the seismic sensor, wherein the predetermined indicator comprises an amplitude of a response signal of the seismic sensor based on natural vibration of the seismic sensor. In other aspects herein, the method includes applying the direct electrical current to the moving coil of the seismic sensor such that the moving coil collides with an end of the seismic sensor, wherein the predetermined indicator comprises a sound caused by the moving coil colliding with the end of the seismic sensor and/or a waveform that is generated by the contact of the moving coil with the end of the seismic sensor. In yet other aspects herein, the predetermined indicator comprises total harmonic distortion (THD) of a signal output from the seismic sensor.

In some embodiments, the method includes superimposing an alternating electrical current on the direct electrical current applied to the moving coil of the seismic sensor; changing the applied direct electrical current such that the total harmonic distortion (THD) of the alternating electrical current increases; and determining a top or bottom of the seismic sensor housing based on the direct electrical current at which there is a sudden increase in the THD of the alternating electrical current. In aspects of the present disclosure, a seismic sensor assembly parameter may be adjusted to correct the coil eccentricity.

Some embodiments disclosed herein include a method for detecting seismic signals comprising deploying one or more seismic sensor configured or designed for seismic signal detection; applying to a moving coil of the one or more seismic sensor a direct electrical current such that the moving coil is dislocated from a neutral position relative to a magnetic field in the one or more seismic sensor; monitoring a predetermined indicator relative to the dislocation of the coil from the neutral position; determining eccentricity of the coil ($\delta$) relative to the center of the magnetic field using the predetermined indicator; utilizing the coil eccentricity for determining tilt of the one or more seismic sensor; and utilizing the tilt of the one or more seismic sensor for seismic signal detection.

In some embodiments, a step test is performed in-situ during seismic signal detection. The step test may be performed during land seismic survey activities. The step test may be performed during borehole or seabed seismic survey activities. The step test may be performed in-situ during seismic survey activities using a wireline survey system. In some aspects of the present disclosure, tilt of one or more seismic sensor may be determined during land seismic survey activities. In other aspects, relative bearing of one or more seismic sensor package may be determined during borehole or seabed seismic survey activities.

In aspects herein, the method may include calibrating the one or more seismic sensor. In other aspects herein, the method may include calibrating the one or more seismic sensor to determine one or more of DC resistance (DCR), natural frequency ($f_0$), open circuit sensitivity ($S_0$), and open circuit damping ($D_0$) of the one or more seismic sensor.

Aspects herein provide a system for determining coil eccentricity of one or more seismic sensor configured or designed for use in seismic signal detection. The system includes at least one seismic sensor having a housing; at least one magnet for creating a magnetic field mounted within the housing; a moving coil mounted within the housing; at least one spring assembly connected to the housing and the moving coil for supporting the moving coil for transduction within the magnetic field. The system also includes a digital signal processor in communication with the seismic sensor and a set of instructions executable by the processor that, when executed, applies to the moving coil of the at least one seismic sensor a direct electrical current such that the moving coil is dislocated from a neutral position relative to the magnetic field in the seismic sensor; monitors a predetermined indicator relative to the dislocation of the coil from the neutral position; and determines eccentricity of the coil ($\delta$) relative to the center of the magnetic filed using the predetermined indicator.

In aspects herein, the at least one seismic sensor may be configured for positioning within a borehole or at a seabed. In other aspects of the present disclosure, the at least one seismic sensor may be configured for positioning on land. The system may include an adjustment mechanism for adjusting or correcting the eccentricity of the moving coil. The set of instructions, when executed, may further perform a step test after dislocating the moving coil from the neutral position. The system may be configured or designed for quality control (QC) activities during manufacture of the at least one seismic sensor.

In other embodiments disclosed herein, the system may be configured or designed for monitoring one or more of: an amplitude of a response signal of the at least one seismic sensor based on natural oscillation of the moving coil inside the seismic sensor; a sound caused by the moving coil colliding with an end of the seismic sensor; a waveform that is generated by contact of the moving coil with an end of the seismic sensor; and total harmonic distortion (THD) of a signal output from the at least one seismic sensor. In aspects of the present disclosure, the system may be configured or designed for land seismic survey activities. In other aspects herein, the system is configured or designed for borehole or seabed seismic survey activities. In yet other aspects, the system may comprise a wireline survey system.

THE DRAWINGS

Other aspects of the present disclosure will become apparent from the following detailed description of embodiments thereof taken in conjunction with the accompanying drawings wherein.

Figure 9:
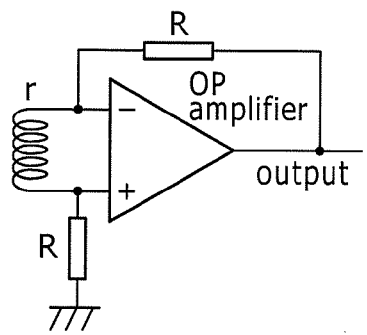
FIG. 9 is a schematic representation of a geophone imaginary short circuit for a geophone.
Figure 10:
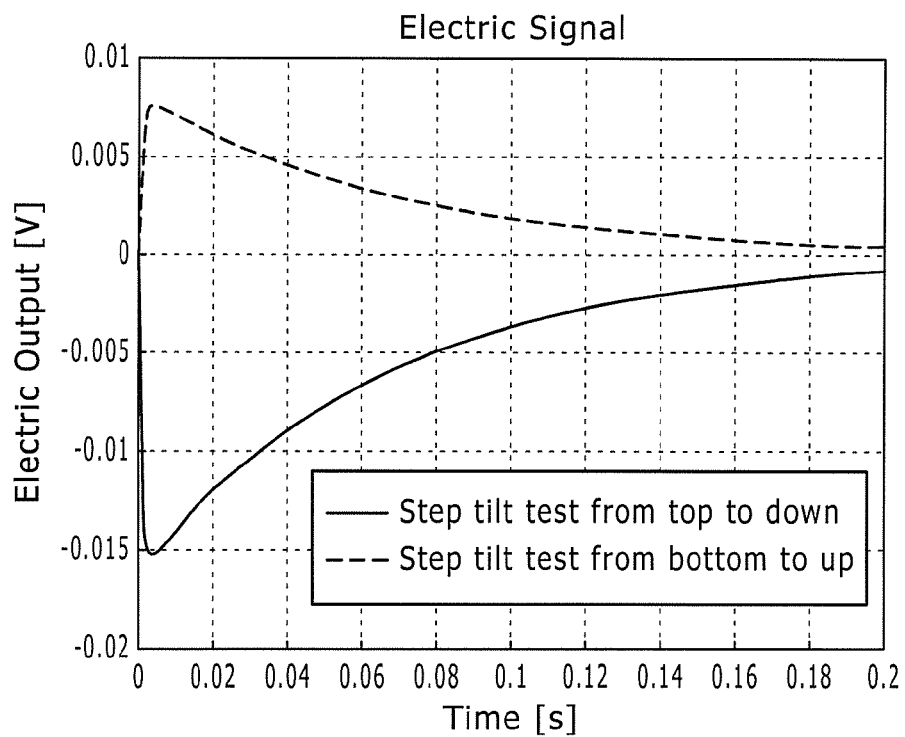
Figure 11:
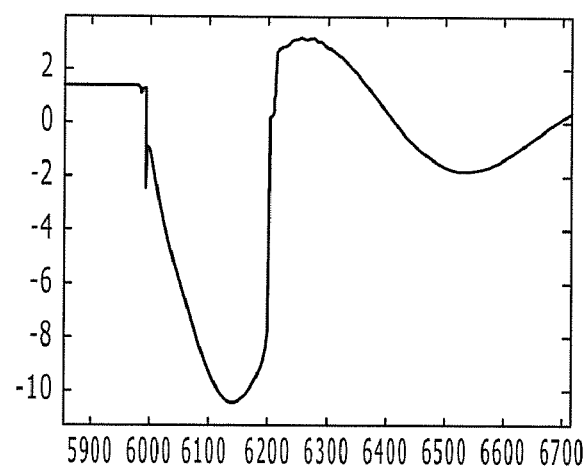
Figure 12:
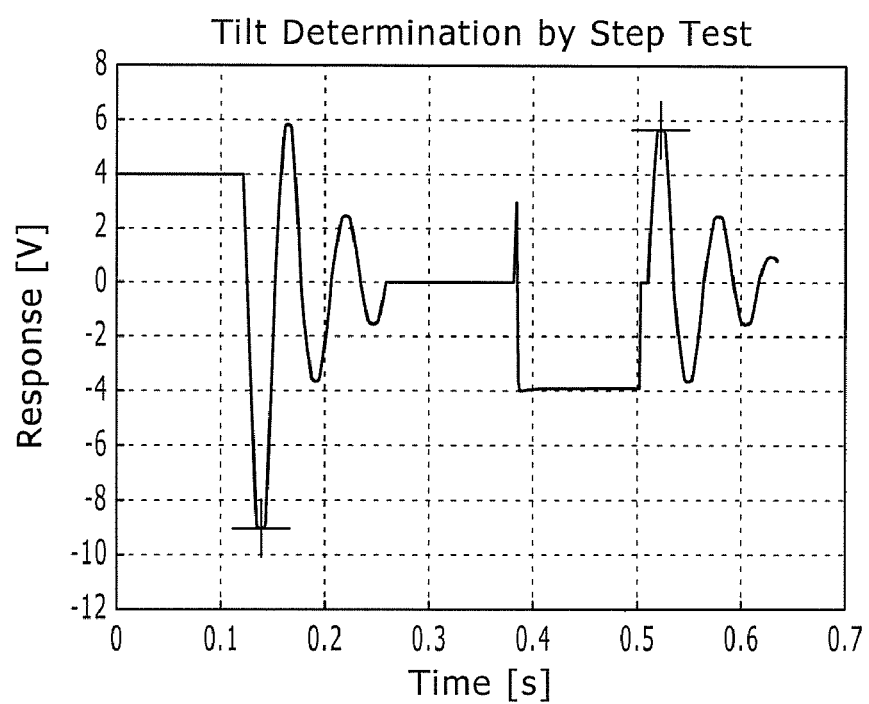
Figure 13:
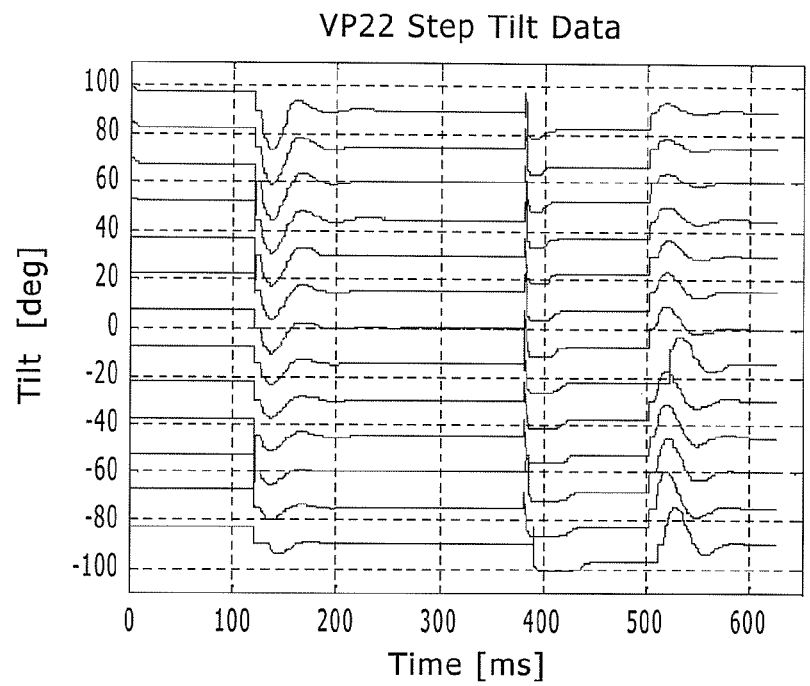
Figure 14A:
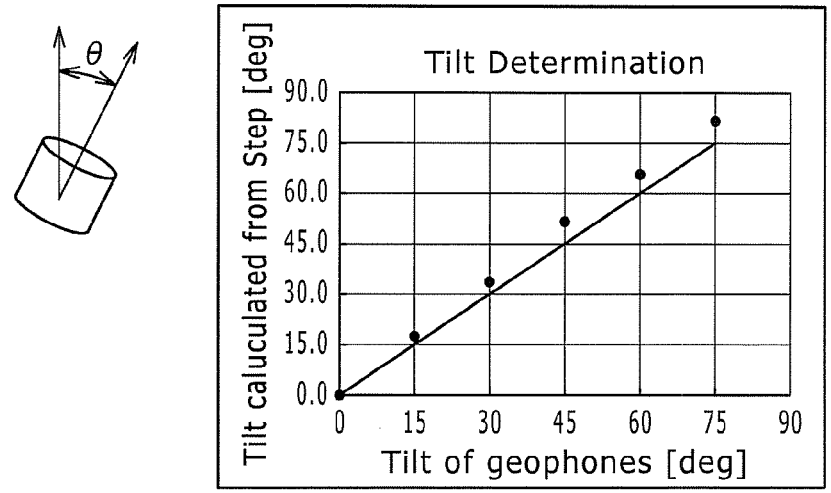
Figure 14B:
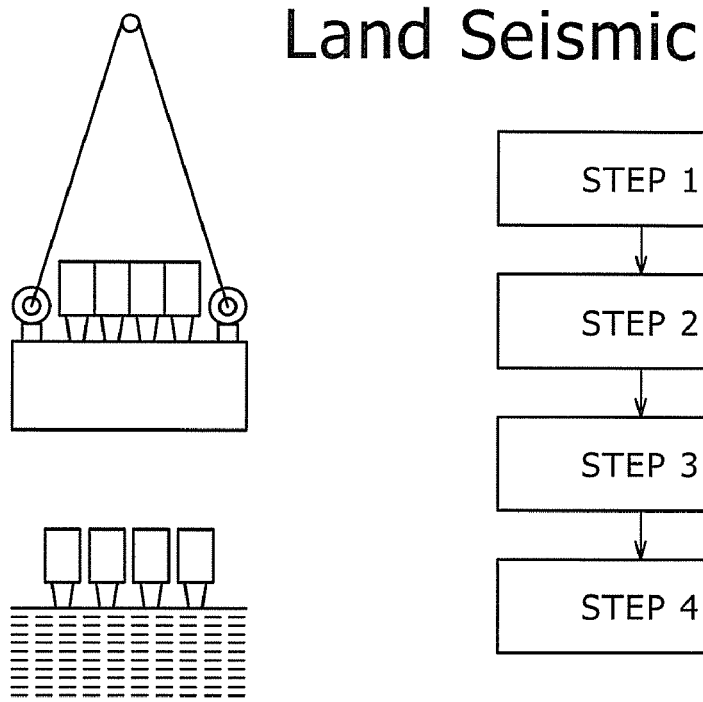
Figure 15A:
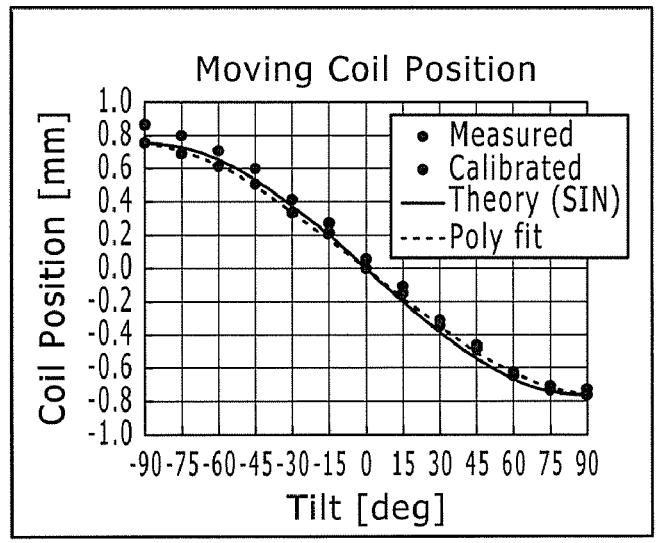
Figure 15B:
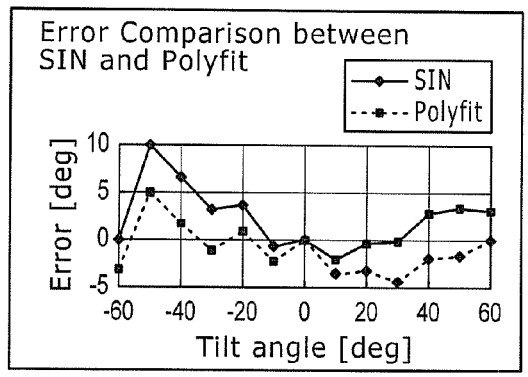
Figure 15C:
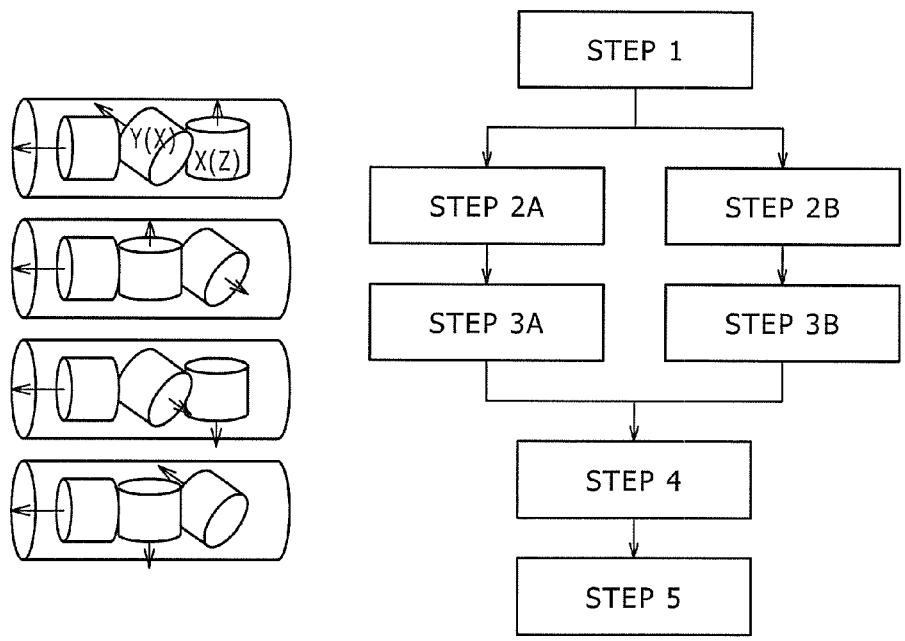
Figure 16A:
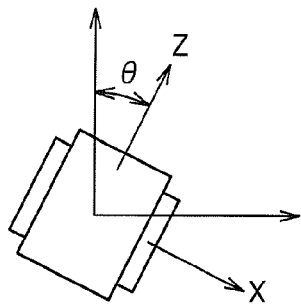
Figure 16A:
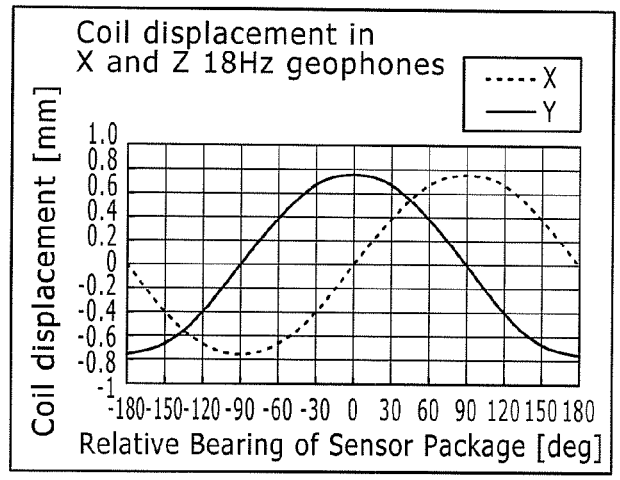
Figure 16B:
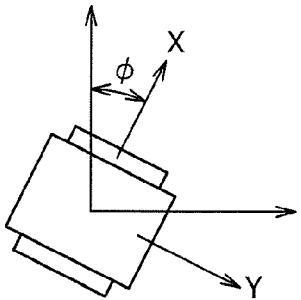
Figure 16B:
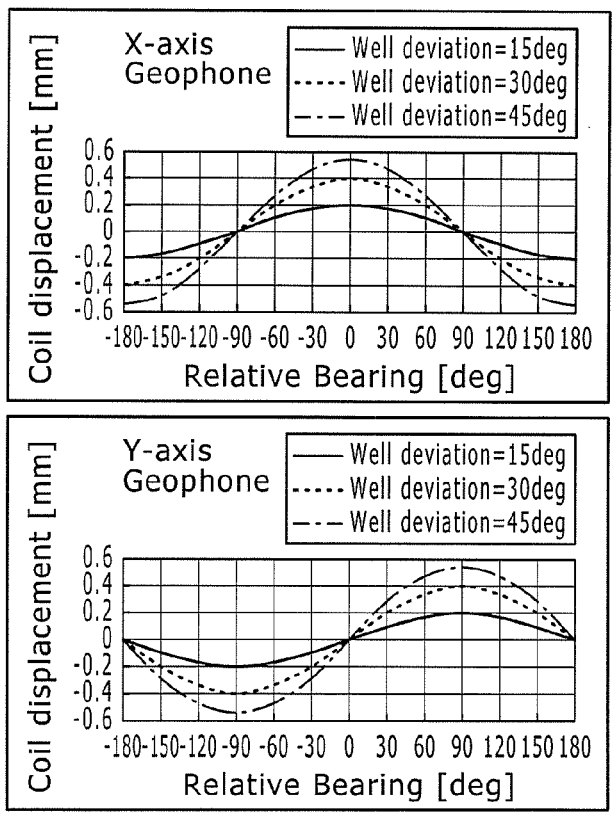
Figure 17:
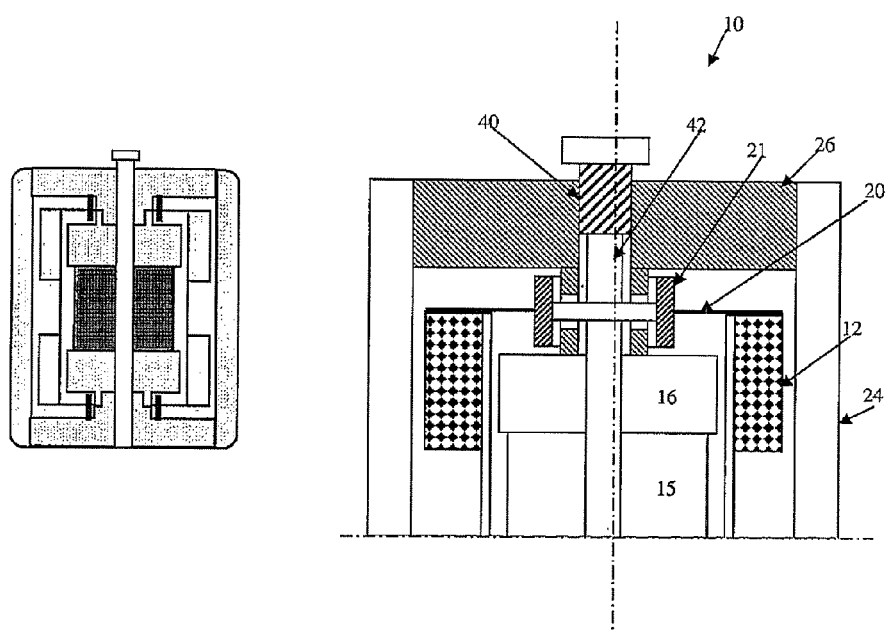

FIG. 10 graphically illustrates simulated geophone coil responses in step up and step down tests with over damping using the imaginary short circuit shown in FIG. 9;

FIG. 11 graphically illustrates collision of a moving coil at the bottom during a step test;

FIG. 12 is a graphical illustration of exemplary measured data for geophone coil responses in step up and step down tests;

FIG. 13 is a graphical illustration of exemplary measured data for geophone coil responses in step up and step down tests at different tilt angles;

FIGS. 14A and 14B depict some exemplary techniques in accordance with the present disclosure for land seismic survey;

FIGS. 15A-15C depict some exemplary techniques in accordance with the present disclosure for seabed and borehole seismic;

FIGS. 16A and 16B depict some exemplary techniques in accordance with the present disclosure for determining relative bearing of sensor packages in seabed and borehole seismic, respectively;

FIG. 17 is a schematic depiction of one exemplary technique for adjusting the position of a moving coil of a geophone to correct for coil eccentricity; and FIG. 18 is a schematic depiction of an exemplary network device for the methods and systems according to the present disclosure.

DETAILED DESCRIPTION

Turning now to the drawings, wherein like numerals indicate like parts, the disclosure herein is directed to the concept of eccentricity (δ) of a moving coil of a geophone type electrodynamic sensor. As used herein, "eccentricity or displacement of the moving coil" refers to the deviation or dislocation of the center of the moving coil relative to the center of the magnetic flux field that is generated by the magnet inside the geophone housing, i.e., the distance between the center of the magnetic field in a geophone and the center of the moving coil. Note again FIG. 1B. In this, the center of the magnetic field in a geophone may be determined from modeling of the magnetic flux field, or by measuring the amount of flux density along the gap between the inside of the geophone housing and the pole pieces of the geophone. As previously discussed above, in seismic signal detection it is advantageous to use geophones with moving coils that are centered relative to the magnetic field that is generated by a magnet mounted inside the geophone housing.

The present disclosure provides various techniques that may be utilized to facilitate and improve seismic signal detection. For example, assembly parameters during geophone manufacturing may be adjusted to improve the quality of the geophones. Assembled geophones may be checked for quality to ensure that they comply with required response specifications to detect or measure seismic signals. In land seismic operations, tilt of the geophones planted in the ground may be determined so that appropriate corrective measures may be employed to obtain vertically oriented geophones for land seismic surveying. In borehole or seabed deployed seismic systems, relative bearing of the deployed geophone sensor packages may be ascertained for purposes of processing the received seismic signals.

The present disclosure contemplates applicability of the disclosed techniques to electrodynamic type sensors, such as a geophone or a seismometer, that are utilized in the field of seismic prospecting, or of active or passive monitoring of underground reservoirs. The sensors may be deployed in exploration and/or production wells that are deviated in relation to the vertical direction, and comprise multi-component geophones for detecting components of signals that are received along three orthogonal axes. In aspects according to the present disclosure, the seismic sensors may be utilized in wireline systems, land seismic surveying systems, seabed seismic surveying systems, permanent or other monitoring systems, including systems for monitoring earthquakes or micro-seismicity in a reservoir, and in factory-based testing and assembly systems for geophones. Some principles of the present disclosure are also described in co-pending, commonly owned, U.S. patent application Ser. No. 11/733,214, titled "Geophone Calibration Technique", the entire contents of which are hereby incorporated herein by reference.

As described in greater detail below, the present disclosure provides various techniques which may be used to facilitate and improve seismic signal detection. For example, one aspect of the present disclosure is directed to a technique for in-situ determination of the tilt of a geophone. Another aspect of the present disclosure is directed to a technique for improving the accuracy of geophone measurements.

The present disclosure contemplates application of the principles herein to various areas, such as wireline, land seismic, seabed seismic, permanent or other monitoring, hydrofracture monitoring, production logging, among others.

Figure 1A:
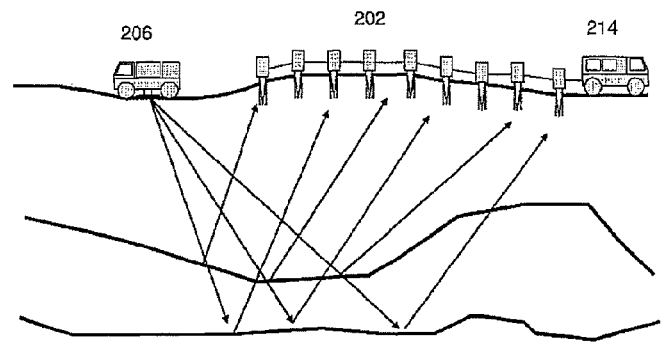
FIG. 1A depicts one exemplary operating context in accordance with the present disclosure for land seismic survey.

FIG. 1A is a schematic depiction of one exemplary technique and system in accordance with the present disclosure for land seismic survey. In FIG. 1A, a surface seismic source 206, such as a vibrator, is shown that may be utilized to produce seismic signals in the ground. The seismic signals are received by geophones 202 that are planted vertically at the surface, and recorded by any suitable recording unit 214, such as the mobile recording unit depicted in FIG. 1A. Although FIG. 1A depicts exemplary land seismic with typical vertical geophones, it is also possible to use three-component geophones of the type discussed below in connection with seabed and borehole seismic. In this, it is contemplated that the techniques disclosed herein with respect to three-component geophones could be applied to land seismic survey as well.

Figure 1B:
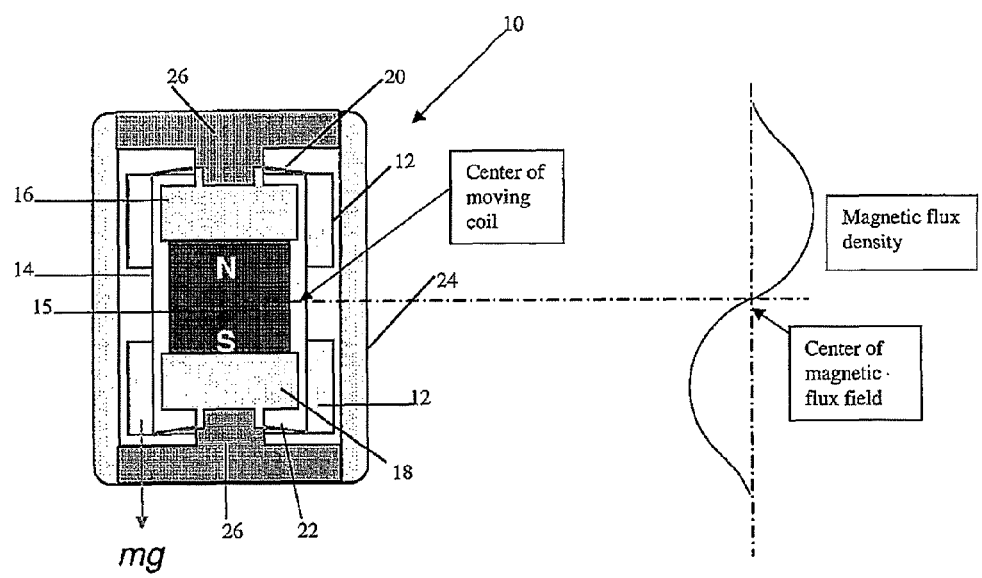
FIG. 1B is a schematic view of a conventional geophone.
Figure 1C:
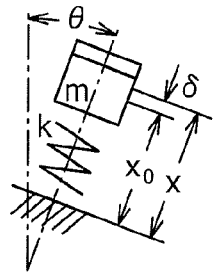
FIG. 1C illustrates schematically the displacement of the center of a moving coil of a geophone from its neutral or rest position $x_o$ to a displaced position x due to tilt $\theta$.
Figure 1D:
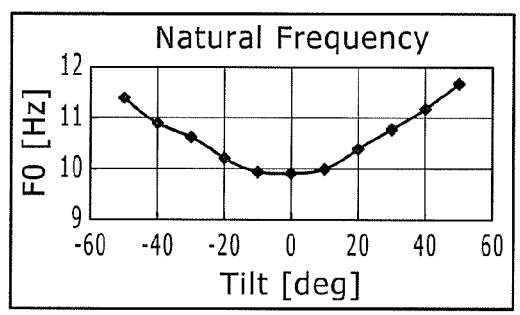
FIG. 1D depicts the relationships between tilt of a 10 Hz vertical geophone and the geophone response parameters $S_o$, $D_o$, and $f_o$ using actual data.
Figure 1D:
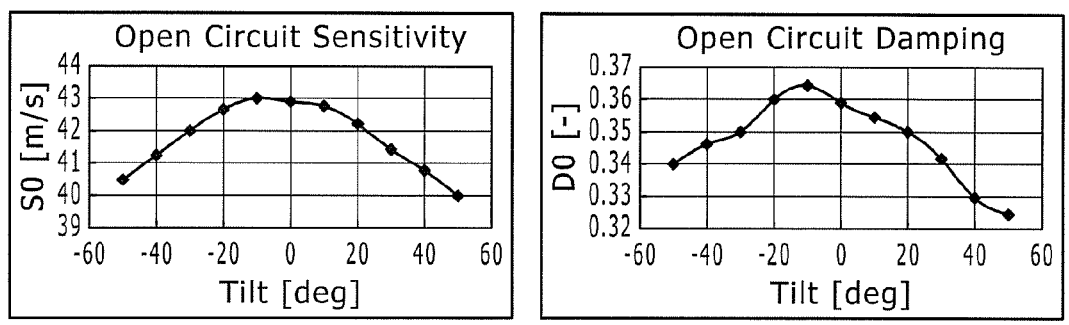

In order to gain a better understanding of the various techniques and features described in this application, a brief description of geophone measurement techniques will now be provided. A seismic survey measures seismic waves propagated through the earth to map structural images in the earth. Geophones are often used to detect seismic signals at various locations, such as, for example, downhole, at ground surface and/or at the seabed. An example of a conventional geophone is shown in FIG. 1B. The geophone 10 of FIG. 1B includes moving coil 12 mounted on a bobbin 14, a magnet 15, a pair of pole pieces 16, 18 with suspension springs 20, 22 and a housing 24 as shown in FIG. 1B. The pole pieces 16, 18 and housing 24 are made of magnetically permeable material and form a magnetic field in which the moving coil 12 is suspended. In the example of FIG. 1B, the moving coil 12, bobbin 14, and suspension springs 20, 22 collectively form the effective moving mass portion (m) of the geophone. As used in this application, the term "geophone" is intended to include conventional-type geophones such as that illustrated in FIG. 1B, and very low frequency geophones such as seismometer type electrodynamic sensors, as well as geophone accelerometer (GAC) devices from Schlumberger Corporation which, for example, may be configured or designed to measure relatively wider acceleration ranges than conventional-type geophones. As shown in the embodiment of FIG. 1B, the geophone 10 includes a moving coil that is suspended in a magnetic flux by means of a spring or a pair of springs. The moving coil tries to stay in the same position while the housing of the geophone is moved in response to external vibrations. FIG. 1C is a schematic depiction of the eccentricity in a moving coil of a geophone that is caused by tilt angle θ, which causes the moving coil to be displaced from its neutral position x to the position $x_0$ as depicted in FIG. 1C. FIG. 1D shows in graphs the changes in geophone response parameters $S_o$, $D_o$, and $f_o$ due to tilt of a 10 Hz vertical geophone using measured data.

Figure 2A:
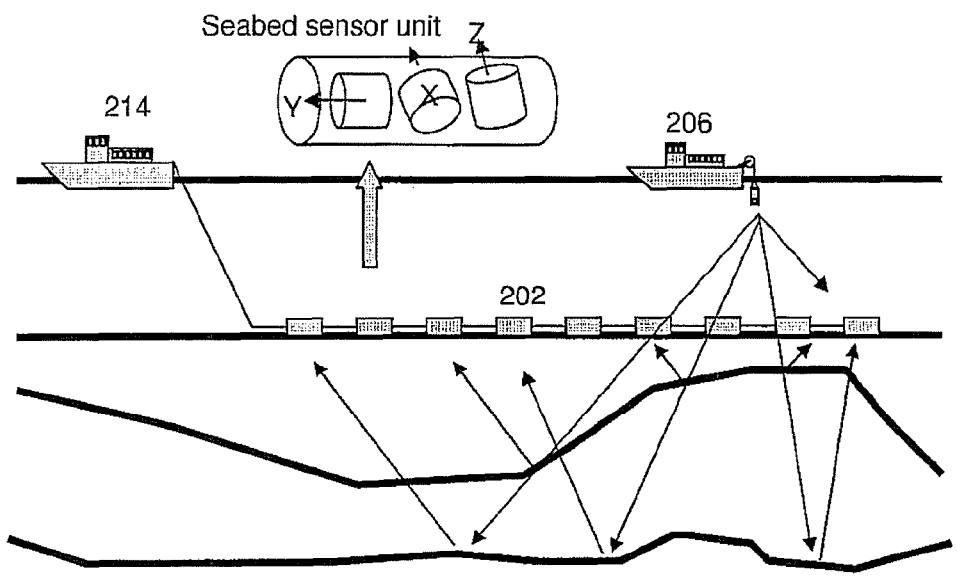
FIGS. 2A and 2B depict another exemplary operating context in accordance with the present disclosure for seabed seismic.
Figure 2B:
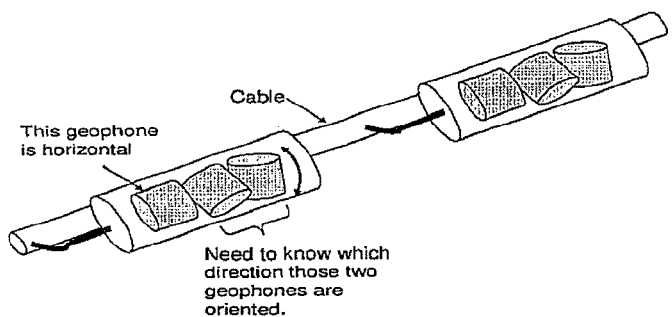

FIGS. 2A and 2B are schematic depictions of other exemplary techniques and systems in accordance with the present disclosure for seabed seismic survey. In FIG. 2A, a sea surface seismic source 206, such as a gun boat, is shown that may be utilized to produce seismic signals in the seabed. The seismic signals are received by geophones that are attached to an ocean bottom cable (OBC) 202, and recorded by any suitable recording unit 214, such as the recording boat depicted in FIG. 2A. FIG. 2B shows a portion of the OBC with 3-component geophone packages or sonde (two are shown in FIG. 2B) attached to the cable. Each sensor package may have three omni-tiltable geophones arranged along the x, y, and z axes thereof (note FIG. 2A). As indicated in FIG. 2B, one geophone of the 3-component geophone package will be horizontally oriented whereas the orientation directions of the remaining two geophones will have to be determined. As described in further detail below (note FIGS. 15A-15C and 16A-B), techniques are provided herein for determining the tilt of the geophones in the sensor package and the relative bearing of the sensor package.

Figure 3A:
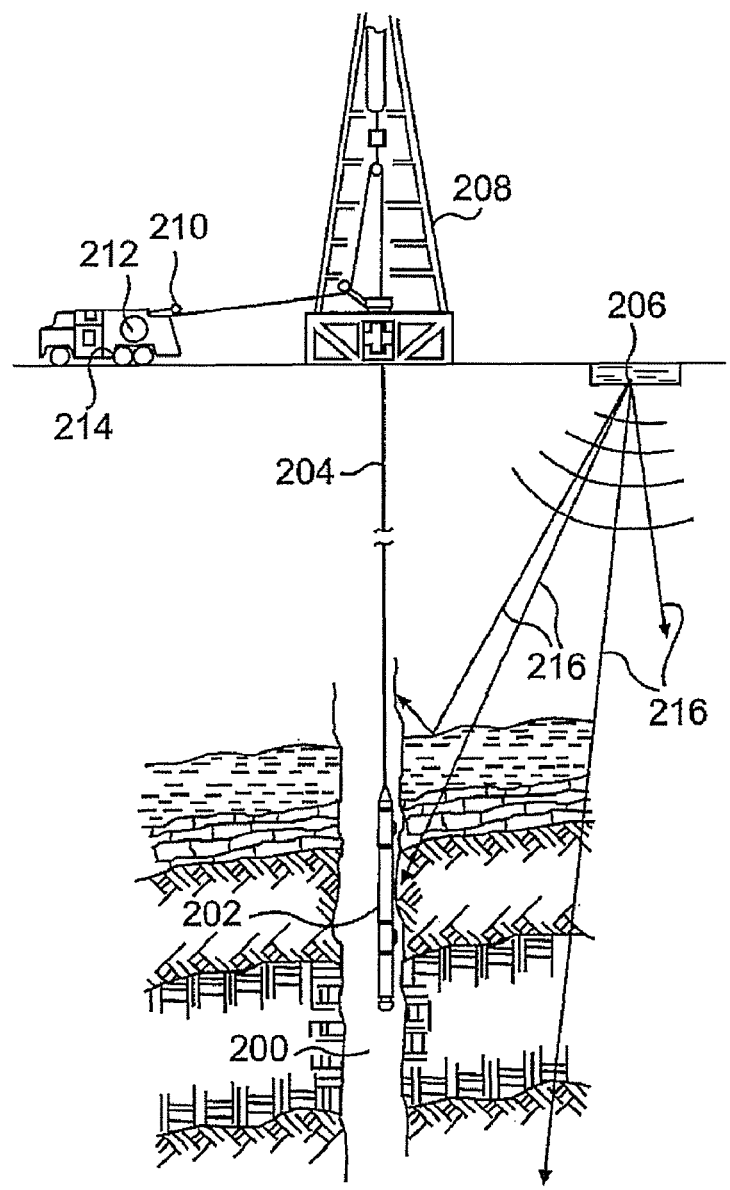
FIGS. 3A and 3B depict yet another exemplary operating context in accordance with the present disclosure for borehole seismic.

FIG. 3A shows another possible configuration that may be used in the practice of the techniques described herein. In FIG. 3A, borehole 200 may be a previously drilled well or a borehole that is being drilled. A seismic source 206 is used to generate a seismic signal 216. The source 206 may be any type of suitable instrumentation for generating the desired signals. The generated signals 216 propagate through the formation, and some signals reach the borehole and a sensor section or sonde 202 of the borehole tool having one or more sensors for detecting the seismic signals. The sensor section 202 and the associated sensors may be used as the primary apparatus for collecting the seismic measurements. In one embodiment, the information collected by the sensor section 202 may be transmitted uphole via a suitable cable 204, for example, a wireline, or other conveyance that is configured for data telemetry, to an analysis module 214 on the surface of the borehole. The analysis module 214 may be a stand alone, or may be integrated into a field vehicle as shown in one example of FIG. 3A. Alternatively, or in combination, some processing or analysis may be conducted downhole, and processed data may be sent uphole by suitable data telemetry apparatus for further processing or other purposes as desirable or necessary.

The sensor section 202 is moved through the borehole 200 by winch 210, via a suitable arrangement in the drilling tower 208, while seismic signals are detected by sensors in the sensor section 202. A device 212 may be used to record the depth of the sensor section so it is known when a measurement is taken.

Figure 3B:
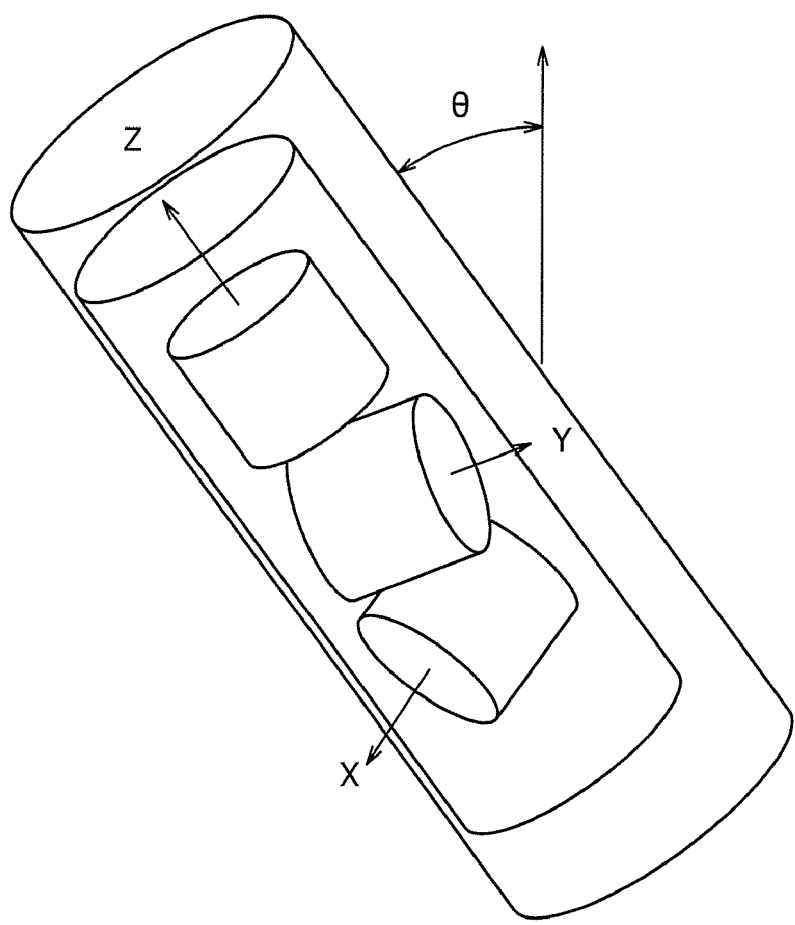

FIG. 3B shows a portion of the borehole tool in FIG. 3A having the sensor section or sonde 202 with 3-component geophones (one sensor section is shown in FIG. 3B). Each sensor section may have three omni-tiltable geophones arranged along the x, y, and z axes thereof as illustrated in FIG. 3B. As indicated in FIG. 3B, one geophone of the 3-component geophones will be oriented along the borehole (in this case the Z-axis geophone) whereas the orientation directions of the remaining two geophones (the Y-axis and X-axis geophones) will have to be determined (note FIGS. 15A-15C and 16A-B).

Figure 4A:
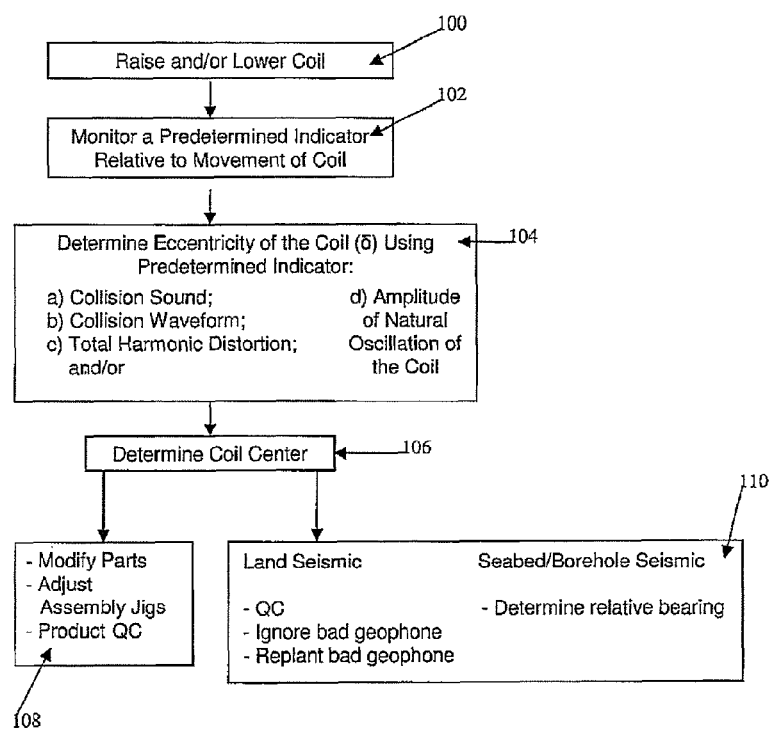
FIG. 4A is a flowchart depicting some techniques according to the present disclosure.

FIG. 4A is a flowchart depicting various techniques disclosed herein. In accordance with the principles discussed hereinafter, the moving coil of a geophone is raised and/or lowered (Step 100) by application of a direct electrical current to the geophone. A predetermined indicator is monitored (Step 102), which is a result of the dislocation of the coil. The predetermined indicator relative to the coil movement may be a sound caused by the moving coil colliding with an end cap of the geophone. The predetermined indicator relative to the coil movement may be a waveform that is generated by the collision of the moving coil with an end cap. The predetermined indicator relative to the coil movement may be total harmonic distortion (THD) of an alternating electrical current superimposed on the direct electrical current applied to the geophone. The predetermined indicator relative to the coil movement may be a geophone response signal based on natural vibration of the geophone when the direct electrical current is released.

In some aspects of the present disclosure, the predetermined indicator may be the sound that is heard or recorded when the moving coil of the geophone hits an end cap and/or a sinusoidal wave change that occurs on collision and is visually noted by an oscilloscope, or by other techniques. On occurrence of the predetermined indicator of sound and/or sinusoidal wave change the corresponding applied direct electrical current is noted and the position x of the moving coil relative to the neutral position $x_0$ is determined. The present disclosure contemplates applying AC current to a geophone to vibrate the moving coil and superimposing DC current to lift and/or lower the coil so that the moving coil of the geophone hits either the top or the bottom end cap of the geophone.

It is assumed that AC current is high frequency and the coil stroke due to AC current is negligible. For a geophone without pre-stress in the spring(s), for example, an omni-tiltable geophone, the DC current balances with gravitational force, mg, and the displacement force of the spring, kx, as:

$$S_0 I = mg + kx$$

where $S_0$ is open circuit sensitivity of the geophone, I is the DC current at which the predetermined indicator is noted, m is the mass of the moving coil, g is the gravitational acceleration, k is the spring constant, and x is the position of the moving coil relative to the neutral position or natural displacement due to gravity $x_0$. Note FIGS. 1C and 5. By noting the current I, and knowing $S_0$, m, and k, from other sources, x may be determined by:

$$x = \frac{S_0 I - mg}{k} \text{ or } x = \frac{S_0 I}{m\omega_0^2} - \frac{g}{\omega_0^2}$$

where $\omega_0$ is the angular natural frequency defined as $\omega_0 = 2\pi f_0$ and $f_0$ is the natural frequency of the geophone.

As discussed above, the predetermined indicator may be sound and/or waveforms that are observed when the moving coil strikes an end cap. Furthermore, the predetermined indicator may be a sudden increase in THD when the moving coil hits the end cap. In addition, the predetermined indicator may be the amplitude of the natural oscillation of the moving coil when an applied current is removed.

Eccentricity of the coil ($\delta$) is determined (Step 104) using one or more predetermined indicator. As previously discussed above, eccentricity of the coil is measured as the distance between center of the magnetic flux field and center of the coil. Note again FIGS. 1B, 1C and 5. The eccentricity of the coil may be utilized for determining the position of the center of the moving coil (Step 106).

In assembly/manufacturing relating to the geophones, the location of the moving coil center may be used for purposes such as modifying assembly parts, adjusting assembly jigs, QC of fabricated products, among other applications that are known to those of skill in the art (Step 108). The information relating to the location of the moving coil center may also be utilized for purposes relating to seismic surveying activities (Step 110).

Figure 4B:
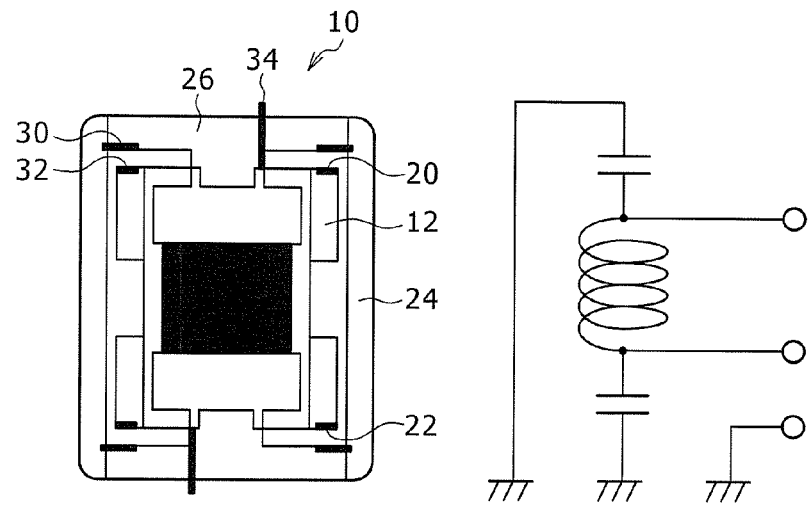
FIG. 4B is a schematic depiction of one exemplary method and apparatus for determining center of a moving coil of a geophone.

FIG. 4B is a schematic depiction of one exemplary technique for determining the location of the center of a moving coil 12 of a geophone 10. As shown in the exemplary circuitry of FIG. 4B, contact points or electrodes 30, 32 may be provided at both ends of the moving coil 12 that are electrically connected to a pair of springs 20, 22. Electrical signals from the moving coil 12 are output by terminal pins 34 that pass through end caps 26 and are connected with springs 20, 22. The electrodes 32 that extend from the springs touch a corresponding contact point 30, which is connected to the metallic housing 24, when the moving coil 12 of the geophone touches an end cap 26. The electrode contact will be determined by monitoring insulation between the terminal(s) 34 and housing 24, via external electrodes 34 and housing 24. In this, the direct current that is applied to the moving coil is monitored when the moving coil touches an end cap.

As previously discussed above, a determination of the center of the geophone moving coil (Step 106 in FIG. 4A) may be utilized for adjusting assembly parameters for geophones, such as adjusting an assembly jig, modifying assembly parts, etc., to ensure that the moving coils of the geophones are properly centered in the magnetic fields during fabrication. Furthermore, measurement of the center of the moving coil for assembled geophones after fabrication provides the ability to eliminate poorly assembled geophones during the manufacturing process. Note again Step 108 in FIG. 4A.

Techniques according to the present disclosure relating to seismic surveying activities (Step 110 in FIG. 4A) are schematically depicted in FIGS. 14A and 14B and FIGS. 15A-15C, and discussed hereinafter.

Figure 5:
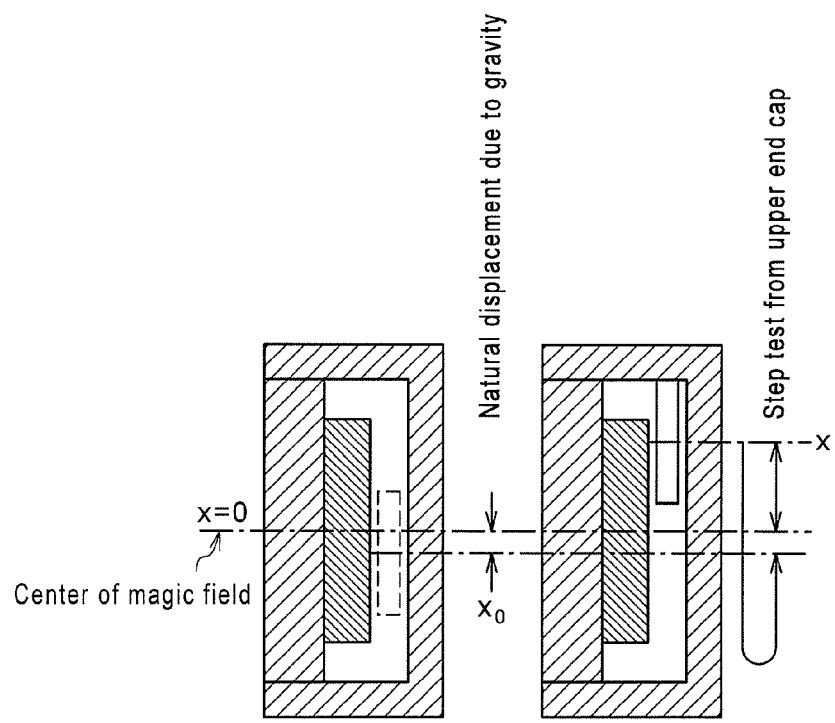
FIG. 5 is a schematic representation of one technique according to the present disclosure for determining geophone coil eccentricity.

As previously described above, a geophone has a moving mass suspended in a magnetic field by means of spring(s) as shown in FIG. 1B. When the geophone is vertical, the moving coil is displaced by the force of gravity, i.e., the natural displacement due to gravity $x_0$. Note FIG. 5. In this, due to pre-stress in the moving coil spring a vertical type geophone will have no natural displacement due to gravity whereas a geophone without pre-stress in the spring will have natural displacement as depicted in FIG. 5. For a low frequency vertical geophone, the spring is pre-stressed so that the moving coil is located in the center of the magnetic field. A geophone configured or designed according to these principles does not function when it is horizontal since the pre-stressed spring brings the coil to the upper end cap. On the other hand, omni-tiltable geophones have higher natural frequencies to reduce the amount of natural displacement so that the natural displacement of the coil is in the working range for all angles of tilt.

When a geophone without pre-stress in the spring, for example, an omni-tiltable geophone, is vertical, the gravity force acting on the moving coil is F=mg, where m is the mass of the moving coil and g is the gravitational acceleration. Note FIG. 1B. A force F that is required to displace the coil is F=kx, where k is the spring constant and x is the position of the moving coil relative to the neutral or natural position $x_0$. Since gravity force is balanced with the force applied by the spring, $$kx = mg \text{ or } x = \frac{mg}{k}. \qquad \text{Equation 1}$$

Since $\omega_0 = \sqrt{\frac{k}{m}}$,

Equation 1 can be rewritten as:

$$x_0 = -\frac{g}{\omega_0^2}$$

where $\omega_0$ is the angular natural frequency defined as $\omega_0 = 2\pi f_0$ and $f_0$ is the natural frequency of the geophone. If the geophone is tilted by $\theta$, measured from the vertical, the natural displacement is:

$$x_0 = -\frac{g}{\omega_0^2}\cos(\theta) \qquad \text{Equation 2}$$

Determination of Tilt

In aspects of the present disclosure, tilt of a geophone may be determined by using a step test. In this, the present techniques are improvements over conventional geophone tilt determination methods since other external sensors, such as tiltmeters, are not required. A direct electrical current that is sufficient to lift and/or lower the moving coil of a geophone is applied to the moving coil so that the moving coil is displaced from its neutral position $x_0$ to the top and/or bottom end cap of the geophone. The direct electrical current is abruptly removed so that the geophone outputs a voltage that is proportional to the initial position. Note FIG. 5. For example, the stroke of a 18 Hz geophone is 1.5 mm and the natural displacement, i.e., the displacement due to gravity, is about 0.76 mm when the geophone is vertical. If the moving coil is initially lifted to the top, then the moving coil is moved by 1.5+0.76=2.26 mm. If the coil is pulled down to the bottom, then the moving coil is moved by 1.5−0.76=0.74 mm.

The present inventors have found that the natural displacement of a moving coil is a function of the tilt of the geophone. The inventors have conceived the idea of geophone tilt determination utilizing a step test in which the moving coil is dislocated to the upper end cap of the geophone housing by applying a voltage that is sufficiently high to lift the moving coil to the maximum position. As shown in FIG. 5, the displacement of the moving coil is no longer a function of applied direct electrical current. The direct electrical current is then released so that the moving coil experiences natural, i.e., free, oscillation or vibration.

The geophone step response may be expressed in geophone parameters, open circuit sensitivity $S_o$, damping factor $D_o$, and natural frequency $f_o$, and the distance $x_1$ that the coil is lifted to the upper end cap, as $$e_1 = -\frac{x_1 S_0 \omega_0}{\sqrt{1-D_0^2}} \exp(-\omega_0 D_0 t) \sin\left(\omega_0 \sqrt{1-D_0^2}\, t\right) \quad \text{Equation 3}$$

Lift distance of the moving coil may be determined from the geophone output signal and the geophone parameters $S_o$, $D_o$, and $f_o$. The first zero crossing occurs at:

$$t_0 = \frac{\pi}{\omega_0 \sqrt{1-D_0^2}} \quad \text{Equation 4}$$

The maximum of sine is at:

$$t_m = \frac{\pi}{2\omega_0 \sqrt{1-D_0^2}} \quad \text{Equation 5}$$

Then the value at sin=−1 is:

$$e_{m1} = -\frac{x_1 S_0 \omega_0}{\sqrt{1-D_0^2}} \exp\left(-\frac{\pi D_0}{2\sqrt{1-D_0^2}}\right) \quad \text{Equation 6}$$

Figure 6:
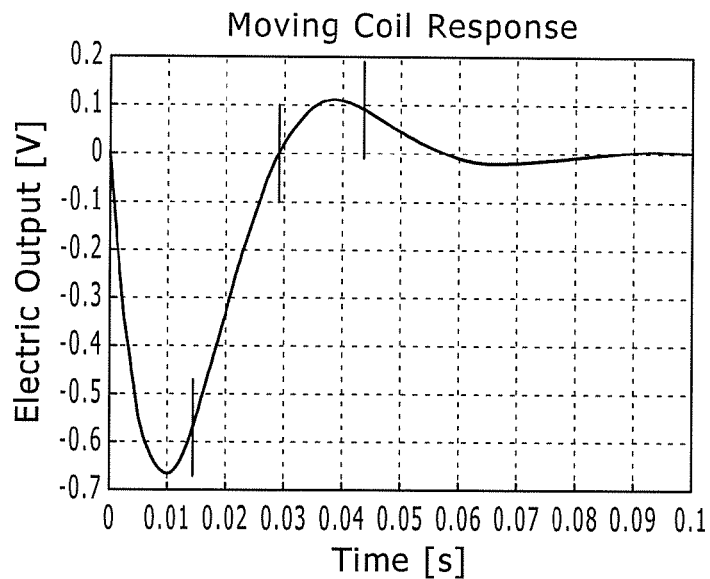
FIG. 6 is a graphical representation of a simulated geophone coil response in a step test.

Note that when sin=−1, the response is slightly off from the actual trough because of the exponent term, as shown in FIG. 6.

An estimation of the tilt of the geophone is possible from the amplitude of the trough. Differentiation of Equation 3 yields:

$$\frac{de}{dt} = -\frac{xS_0\omega_0^2}{\sqrt{1-D_0^2}} \exp(-\omega_0 D_0 t) \left\{-D_0 \sin\left(\omega_0\sqrt{1-D_0^2}\,t\right) + \sqrt{1-D_0^2} \cos\left(\omega_0\sqrt{1-D_0^2}\,t\right)\right\} \quad \text{Equation 7}$$

The local maximum occurs when:

$$\frac{de}{dt} = -\frac{xS_0\omega_0^2}{\sqrt{1-D_0^2}} \exp(-\omega_0 D_0 t)\cos\left(\omega_0\sqrt{1-D_0^2}\,t - \varphi\right) = 0 \quad \text{Equation 8}$$

where the phase delay is $$\varphi = \tan^{-1}\left(-\frac{D_0}{\sqrt{1-D_0^2}}\right) \quad \text{Equation 9}$$

Since Equation 8 is satisfied when:

$$\cos(\omega_0\sqrt{1-D_0^2}\,t - \phi) = 0 \quad \text{Equation 10}$$

the first local maximum occurs at:

$$t_p = \frac{\frac{\pi}{2} + \tan^{-1}\left(-\frac{D_0}{\sqrt{1-D_0^2}}\right)}{\omega_0 \sqrt{1-D_0^2}} \quad \text{Equation 11}$$

Then the amplitude of the trough is:

$$e_{p1} = \frac{x_1 S_0 \omega_0}{\sqrt{1-D_0^2}} \exp(-\omega_0 D_0 t_p) \quad \text{Equation 12}$$

By measuring the amplitude $e_{p1}$, distance $x_1$ that the coil is lifted to the upper end cap can be determined by Equation 12. As discussed above, the distance $x_1$ is relative to the center of the moving coil.

Temperature Effects

The present inventors have noted that there are temperature effects in determining geophone tilt using a step test. In this, the inventors realized that the geophone response parameters $S_o$, $D_o$, and $f_o$ change with temperature changes.

Figure 7:
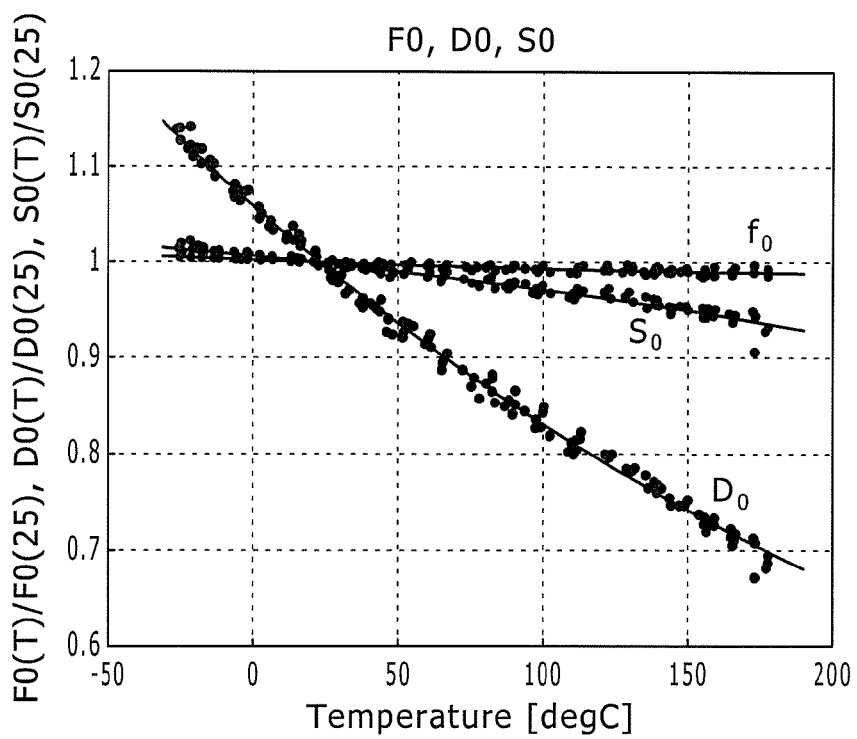
FIG. 7 is a graphical representation of the temperature dependence of geophone response parameters $S_o$, $D_o$, and $f_o$, for a test geophone.

FIG. 7 shows the temperature dependence of the geophone response parameters $S_o$, $D_o$, and $f_o$ for one type of geophone using test data. In this, while calculating the moving coil position or the angle of tilt, the geophone response parameters may be calibrated at working conditions, i.e., in-situ.

Alternatively, it is also possible to predict the geophone response parameters by measuring the temperature. In this, the DC resistance (DCR), R, of the moving coil changes with temperature, for example, for a copper (Cu) wire, as follows:

$$R = R(20)*(1+0.00393DT) \quad \text{Equation 13}$$

Where R(20) is a nominal resistance measured at 20 degrees centigrade and DT is the temperature difference from the reference temperature, 20 degrees centigrade. Therefore, it is possible to measure the temperature of a geophone by measuring the moving coil resistance. Then the geophone response parameters can be predicted from the temperature curves as shown in FIG. 7. The aforementioned principles relating to DCR and temperature are described in more detail in the prior U.S. patent application Ser. No. 11/733,214, previously incorporated herein by reference.

The natural frequency $f_o$, open circuit damping $D_o$, and open circuit sensitivity $S_o$, for one type of geophone shown in FIG. 7, may be defined as:

$$f0(T)=f0(20)*(6.4082e-8*DT^2-9.4429e-5*DT+1) \quad \text{Equation 17}$$

$$D0(T)=D0(20)*(2.9535e-6*DT^2-0.0026*DT+1) \quad \text{Equation 18}$$

$$S0(T)=S0(20)*(-7.2594e-7*DT2-2.7676e-4*DT+1.) \quad \text{Equation 19}$$

To avoid calibration and compensation errors, it is possible to eliminate $D_0$ and $S_0$ from geophone tilt determination. By displacing the geophone moving coil to the bottom end cap of the geophone, the response is written as:

$$e_2 = -\frac{x_2 S_0 \omega_0}{\sqrt{1-D_0^2}} \exp(-\omega_0 D_0 t) \sin\left(\omega_0 t \sqrt{1-D_0^2}\right) \quad \text{Equation 20}$$

Figure 8:
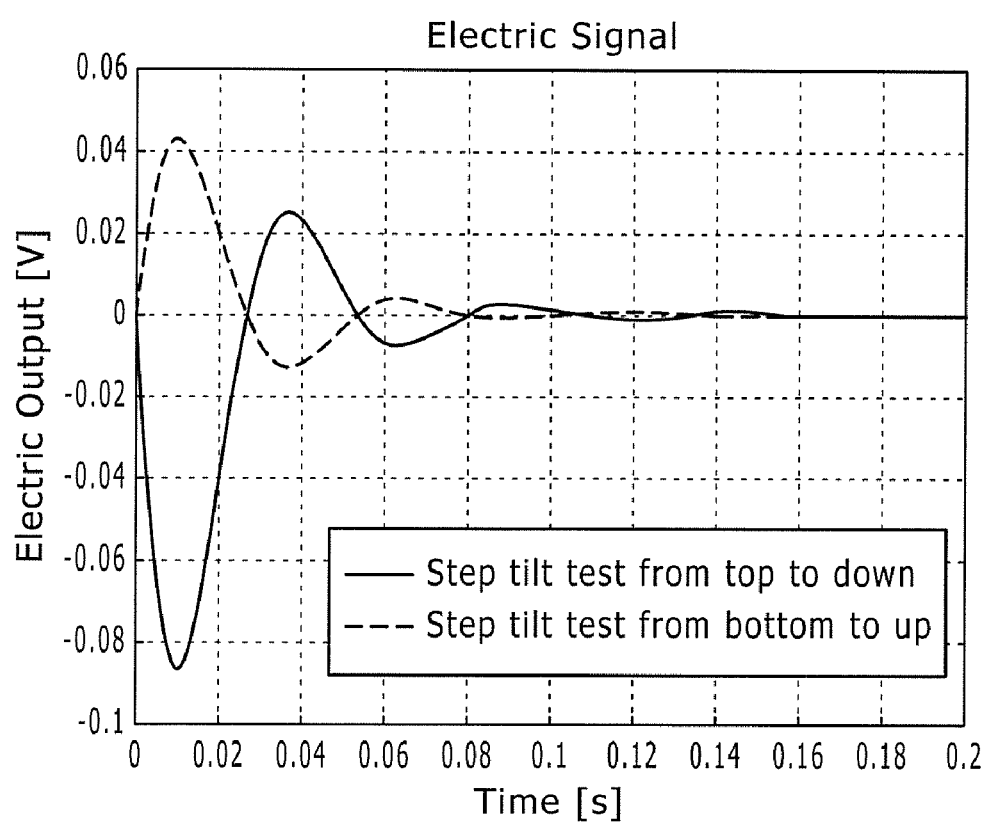
FIG. 8 is a graphical representation of simulated geophone coil responses in step up and step down tests when the geophone is in a vertical position without pre-stress in the spring.

It is noted that Equation 3 was a step down response from the upper end cap of the geophone and Equation 20 is a step up response from the lower end cap of the geophone. Both responses are simulated and shown in FIG. 8.

By dividing $e_1$ by $e_2$, the time response terms are cancelled and the ratio is simply reduced to the ratio of traveling distances as:

$$\frac{e_1}{e_2} = \frac{-\dfrac{x_1 S_0 \omega_0}{\sqrt{1-D_0^2}} \exp(-\omega_0 D_0 t) \sin\left(\omega_0 t \sqrt{1-D_0^2}\right)}{-\dfrac{x_2 S_0 \omega_0}{\sqrt{1-D_0^2}} \exp(-\omega_0 D_0 t) \sin\left(\omega_0 t \sqrt{1-D_0^2}\right)} = \frac{x_1}{x_2} \quad \text{Equation 21}$$

The sum of the travel distance to the upper end cap and the travel distance to the lower end cap is the space available for the coil to move. The sum is called "maximum excursion" and is defined as:

$$x_1 - x_2 = x_m \quad \text{Equation 22}$$

Combining Equations 21 and 22 yields an expression for coil eccentricity, $\delta$.

$$\delta = -\frac{x_m}{2} \frac{e_1+e_2}{e_1-e_2} \quad \text{Equation 23}$$

$e_1$ and $e_2$ may be determined at any point in the geophone step responses. For example, the first peak and trough; the second, third peak and trough or even later; an integration of half cycle up to the first zero crossing; the integral of absolute values over the same time period. To determine the coil eccentricity $\delta$, only the number representing the ratio of $e_1$ and $e_2$ is needed.

The coil eccentricity $\delta$ is related to the angle of tilt as:

$$\delta - \delta_0 = \frac{g}{\omega_0^2} \cos\theta \quad \text{Equation 24}$$

where $\delta_0$ is the coil position value when a geophone is in a horizontal position. Ideally, $\delta_0$ is zero; however, in reality $\delta_0$ will be a finite number due to manufacturing tolerances. It is also noted that the coil eccentricity $\delta$ is a function of the voltage responses for the step down and step up tests. The angle of tilt is determined from the moving coil eccentricity and spring constant or natural frequency $f_0$ that is least sensitive to temperature, as shown in FIG. 7.

Step Test with Imaginary Short

As previously mentioned above, a GAC is a geophone that is configured or designed for specific applications. In this, a GAC is usually used in an imaginary short fashion. Note FIG. 9. Further description relating to the device of FIG. 9 may be found in Japanese Patent No. P3098045. The negative feedback makes the input to zero volt and the input impedance is zero. If a geophone is connected to such an operational amplifier with an imaginary short, as shown in FIG. 9, the geophone behaves as an accelerometer. In this case, the total damping factor becomes:

$$D = D_0 + \frac{S_0^2}{2rm_0\omega_0} \quad \text{Equation 25}$$

and the step responses from the top and the bottom end caps are written as:

$$e_1 = -\frac{RS_0 x_1 \omega_0}{r\sqrt{1-D^2}} \exp(-\omega_0 Dt) \sin\left(\omega_0 t \sqrt{1-D^2}\right) \quad \text{Equation 26}$$

$$e_2 = -\frac{RS_0 x_2 \omega_0}{r\sqrt{1-D^2}} \exp(-\omega_0 Dt) \sin\left(\omega_0 t \sqrt{1-D^2}\right) \quad \text{Equation 27}$$

It should be noted that $\sqrt{1-D^2}$ becomes an imaginary number for $D>1$.

Since the ratio of the step responses is reduced in the same fashion as Equation 21 above, the results, i.e., Equations 22, 23 and 24 above, are still valid.

FIG. 10 shows simulated step responses based on the parameters shown below with over damping using the imaginary short circuit shown in FIG. 9.

f0=18 [Hz]
S0=79 [V/(m/s)]
D0=0.36
m0=0.00314 [kg]
r=1500 [ohm]
xm=2.8/2 [mm]
R=100000 [ohm]

The present inventors considered the question as to what will happen if a step test causes collision of the moving coil at the bottom end cap. FIG. 11 shows the result of such a collision. The electrical output is proportional to the velocity of the moving coil. The trough occurs when the moving coil passes the center of maximum excursion. Then, the moving coil hits the bottom end cap of the geophone (when the coil hit the bottom the polarity is reversed). As previously described above, $e_1$ and $e_2$ may be determined at any point of the step responses, and a characteristic amplitude can be determined at the trough even if there is a collision of the moving coil afterwards (i.e., it is possible to measure the first peak before the coil hits the bottom as long as the amplifier does not saturate).

FIG. 12 shows an example of step down and step up responses measured sequentially using a geophone. The amplitudes are determined at the first trough and the first peak. FIG. 13 shows step down and step up responses for different angles of tilt using measured data. The amplitudes of the step down and step up responses are similar when the angle of tilt is zero (measured from a horizontal position). The step down amplitude is higher than the step up amplitude when angle of tilt increases.

FIGS. 14A and 14B depict exemplary techniques in accordance with the present disclosure for land seismic survey. FIGS. 15A-15C depict some exemplary techniques in accordance with the present disclosure for seabed seismic and borehole seismic surveys.

For land seismic survey, the geophone is assumed to be in a vertical orientation (note FIG. 1A). In this, the angle of tilt (θ) measured from the vertical is to be determined, as shown in FIG. 14A. FIG. 14B shows exemplary techniques for land seismic surveying wherein the eccentricity of a moving coil may be determined using the techniques herein. As previously discussed above, the techniques of the present disclosure may be utilized for determining tilt of a geophone, for example, a geophone that is planted in the ground for land seismic. In this, quality control (QC) of the geophones planted in the ground may be performed based on the determined eccentricity of the moving coils of the geophones to see if the geophones are vertically planted, or are planted within the tilt tolerances for seismic data acquisition by use of the geophones. In such a situation, it would be possible to inform the person or persons who planted the geophones to replant them so that the geophones are properly planted in the ground for purposes of land seismic survey. For example, the person or persons who planted the geophones may perform the testing during the geophone planting operation to ensure that the geophones are properly planted. Such QC information may be used to verify the quality of the geophone planting operation providing a client with a valuable answer product/service.

As depicted in FIG. 14B, geophones need to be calibrated at their vertical orientation (Step 1). For example, prior to planting geophones may be mounted on a calibration block (schematically depicted in FIG. 14B) that is suspended in a horizontal position. The natural displacement of the moving coil(s), including any manufacturing tolerance, may be determined at their vertical position. After the geophones are planted for land seismic, step tests may be conducted (Step 2), and using in-situ calibration or measured DC resistance (DCR), geophone response parameters $S_0$, $D_0$, and $f_0$, may be determined (Step 3), as previously discussed above. Alternatively, or in addition, both step up and step down tests may be conducted. The data may be used to determine the moving coil position (Step 4), as discussed above.

Table 1 below shows the experimental results for a geophone used in land seismic. The first peak amplitude was measured from step test data. The moving coil eccentricity was calculated from the peak measurements. When tilt is zero, the natural displacement is −0.7373 mm, while the theoretical value that is calculated based on $f_0$=18 Hz is 0.7662 mm. The calculated results are graphically shown in FIG. 14A. It is noted that the above discrepancy between the calculated and theoretical values may be due to tolerance of $f_0$ and/or non-linearity of the spring. To calculate the tilt angle (θ) from the measured signal, the data is calibrated so that the moving coil eccentricity is the same as the theoretical number, as shown in the column to the right of coil eccentricity in Table 1 below. The angle of tilt was estimated by using Arc SIN($\delta/(\omega_0^2/g)$) based on a nominal natural frequency of 18 Hz. The calculated tilt is only a few degrees off from the actual tilt of the geophone.

TABLE 1

| Tilt [deg] | Amplitude e1 [V] | e2 [V] | Coil eccentricity [mm] | Calibration 1.0391 | Tilt calculated [deg] | Error [deg] |
|---|---|---|---|---|---|---|
| 0 | −5.721 | 1.774 | −0.7373 | −0.7662 | 0.0 | 0.0 |
| 15 | −5.632 | 1.862 | −0.7045 | −0.7320 | 17.2 | −2.2 |
| 30 | −5.398 | 2.094 | −0.6174 | −0.6415 | 33.1 | −3.1 |
| 45 | −4.990 | 2.507 | −0.4639 | −0.4820 | 51.0 | −6.9 |
| 60 | −4.544 | 2.915 | −0.3058 | −0.3177 | 65.5 | −5.5 |
| 75 | −4.049 | 3.464 | −0.1089 | −0.1132 | 81.5 | −6.5 |

It is noted that there are some residual coil centering errors in the geophones used for the experiments which are less than 0.1 mm; however, the error is finite. To improve the determination of coil eccentricity, the residual coil centering errors can be calibrated by maintaining the sensor in a horizontal orientation, a measured value for $f_0$ may be used, and spline function may be used to fit the non linear behavior. For land seismic applications, the maximum tilt is 90 degrees, i.e., the geophone is horizontal, and a simple calculation of sinusoidal function may be good enough for quality control purposes. Even if the geophone is replanted, it is not possible to control the orientation within a few degrees of tilt.

For OBC and borehole seismic surveys, the geophones are designed for use in horizontal, vertical or upside down orientation (note FIGS. 2A, 2B, 3A and 3B). In this, the relative bearings of two components of the 3-component geophone package have to be determined, as shown in FIGS. 2B and 3B. As previously discussed above, the techniques of the present disclosure may be utilized for determining relative bearing of a geophone package, for example, a geophone package that is deployed at the seabed or in a borehole for seismic survey.

FIG. 15C shows exemplary techniques for seabed and borehole seismic surveying wherein the tilt of a moving coil may be determined using the techniques that are disclosed herein. In this, relative bearing of a seismic sensor package deployed in a borehole or at a surface of a seabed may be determined based on the tilt of the geophone(s) in the package. In Step 1, the sensor package is held horizontally and the center of the moving coil is calibrated. The sensor package is also held vertically and upside down in order to find the maximum natural displacement. In Step 2A, after the geophones are deployed, a calibration is run for DCR, S0, D0, and f0. Alternatively, in Step 2B, after the geophones are deployed, the temperature is read and f0(T) is estimated. In Step 3A a Step Tilt test is run. Alternatively, in Step 3B, a Step Tile test is run from both up and down. In Step 4 the coil position is calculated. And in Step 5, the tilt is calculated. One additional note, for X(Z), X is for the borehole and (Z) is for the seabed. And for Y(X), Y is for the borehole and (X) is for the seabed.

For borehole seismic (note FIGS. 3A and 3B), the two horizontal sensors X and Y are horizontal when the tool is vertically positioned. The tilt of the vertical geophone Z is the same as the deviation of the well. In this, the tilt angles of the two horizontal geophones X and Y are to be determined so as to find the orientation (relative bearing) of the sensor package in the well, as shown in FIG. 3B. The tilt angle (θ) is measured from the vertical axis when the geophone is in a horizontal position, as shown in FIG. 15A.

The coil eccentricity is calculated from test data shown graphically in FIG. 15A, and is tabulated in Table 2 below for different tilt angles (shown in FIG. 15A) for the horizontal geophone.

TABLE 2

| | Signal | | Coil eccentricity [mm] | | | | |
|---|---|---|---|---|---|---|---|
| Tilt [deg] | e1 [V] | e2 [V] | Measured | Offset | Amplitude | SIN | Poly fit |
| 90 | −5.721 | 1.774 | −0.7373 | −0.7822 | −0.7662 | −0.7662 | −0.7650 |
| 75 | −5.632 | 1.862 | −0.7045 | −0.7494 | −0.7340 | −0.7401 | −0.7197 |
| 60 | −5.398 | 2.094 | −0.6174 | −0.6623 | −0.6487 | −0.6635 | −0.6282 |
| 45 | −4.990 | 2.507 | −0.4639 | −0.5088 | −0.4983 | −0.5418 | −0.5011 |
| 30 | −4.544 | 2.915 | −0.3058 | −0.3507 | −0.3435 | −0.3831 | −0.3480 |
| 15 | −4.049 | 3.464 | −0.1089 | −0.1538 | −0.1507 | −0.1983 | −0.1782 |
| 0 | −3.642 | 3.883 | 0.0449 | 0.0000 | 0.0000 | 0.0000 | 0.0000 |
| −15 | −3.067 | 4.532 | 0.2697 | 0.2248 | 0.2080 | 0.1983 | 0.1782 |
| −30 | −2.663 | 4.884 | 0.4120 | 0.3671 | 0.3396 | 0.3831 | 0.3480 |
| −45 | −2.165 | 5.393 | 0.5979 | 0.5530 | 0.5117 | 0.5418 | 0.5011 |
| −60 | −1.842 | 5.628 | 0.7097 | 0.6648 | 0.6151 | 0.6635 | 0.6282 |
| −75 | −1.627 | 5.941 | 0.7980 | 0.7531 | 0.6968 | 0.7401 | 0.7197 |
| −90 | −1.408 | 6.071 | 0.8729 | 0.8281 | 0.7662 | 0.7662 | 0.7650 |

The results are also shown in the graph of FIG. 15A. It is seen that the moving coil is not in the center position when the tilt is zero. This is due to fabrication errors in the test geophone. It is also seen that the measured coil eccentricity is slightly larger than the theoretically calculated coil eccentricity based on the nominal natural frequency. The error may be due to 1) the actual $f_0$ may not be the same as the nominal $f_0$, and 2) an extra force is required to overcome the non-linearity of the spring to fully displace the coil to the end of the housing.

For a downhole seismic tool and seabed sensor package, it is possible to perform a calibration when the sensor package is horizontal. The positions of the geophones in the sensor package are changed by rotating the sensor package. The measured moving coil eccentricity at zero tilt is removed from all the measured coil positions for different sensor orientations (see column Offset in Table 2 above). The measured moving coil eccentricity is calibrated to the coil eccentricity measured at the vertical and up side down positions (see column Amplitude in Table 2 above). The calibrated coil eccentricity is also shown in FIG. 15A.

The present inventors have also used a polynomial expansion instead of a sinusoidal function. Since the angle of tilt and moving coil eccentricity measurements are in a one-to-one relationship, it is possible to express the angle of tilt by a polynomial function of moving coil eccentricity instead of a sinusoidal function. As seen in FIG. 15B, the error for the tilt obtained from sinusoidal function was a few degrees different from the measurements. A large error for a large tilt is acceptable for land seismic applications, since such geophones are not supposed to be used horizontally, and the QC is meant to find such poorly planted geophones. For seabed and borehole seismic, the geophones can be tilted by any angle, and the amount of the tilt is the information of interest to find the direction of seismic wave propagation. It is possible to model the non-linearity by high order sinusoidal functions, such as $$p = -\frac{g}{\omega_0^2}\{\cos(\theta) + a_2\cos(2\theta) + a_3\cos(3\theta)...\};$$

however, it is cumbersome to find θ from p from such an equation.

First, calibration data are obtained when the sensor is vertical, horizontal, and upside down. Then, the value when the sensor is horizontal is subtracted. The relationship between normalized coil eccentricities and tilt angles is expressed by a single fifth order polynomial. A polynomial function was obtained by curve fitting test data from two geophones and is:

$$\text{tilt} = 2.606e-12p^5 + 4.073e-7p^3 - 0.01197p \quad \text{Equation 28}$$

where tilt is in degrees and p is the normalized moving coil eccentricity. It is seen in FIG. 15B that polynomial fitting matches with measured data better than a sinusoidal function. FIG. 15C shows a calibration process of the sensor package for borehole seismic and seabed seismic. By rotating the sensor package, two horizontal geophones for borehole seismic and one vertical geophone and one horizontal geophone for seabed seismic are calibrated every 90 degrees. FIG. 15C also depicts two possible methods for determining tilt of geophones in a borehole or at a seabed.

FIGS. 16A and 16B depict some exemplary techniques in accordance with the present disclosure for determining relative bearing of sensor packages in seabed and borehole seismic, respectively.

In a sensor package that is attached to an OBC cable, the geophones at the Z-axis and X-axis can rotate when the OBC cable is deployed. If the Z-axis geophone is tilted by θ degrees, the X-axis geophone will be tilted by θ+90 degrees. The amount of displacement or eccentricity of the moving coil of a geophone in the sensor package is determined by the relative bearing of the sensor package, as shown in FIG. 16A for seabed seismic applications.

It is possible to determine the tilt of a geophone in a sensor package by measuring the coil displacement or eccentricity of either the Z-axis or X-axis geophone. If both are used, it is possible to find out whether the sensor package is tilted in the direction of the X-axis geophone, i.e., the relative bearing of the sensor package.

In borehole seismic on the other hand (note FIG. 16B), if the well is vertical it is not possible to find the relative bearing of the sensor package. Typically, a borehole has some deviation, and the well trajectory may be determined by other methods such as, for example, measurement-while-drilling or a gyroscope survey.

Since the tilt of the Z-axis geophone is the same as the deviation of the well (note again FIG. 3B), it is not necessary to determine its tilt although it may be desirable to cross check the measurements. However, since the sensor package orientation in the borehole is unknown, and as discussed above sensor packages tend to be cylindrical and prone to rotating in the borehole, the relative bearing along the X-axis and Y-axis needs to be determined.

If the well deviation is finite, the moving coil displacements of the X-axis and Y-axis geophones are:

$$\delta_x = \frac{g}{\omega_0^2}\cos(\theta)\cos(\varphi) \quad \text{For X-axis geophone}$$

$$\delta_y = \frac{g}{\omega_0^2}\cos(\theta)\sin(\varphi) \quad \text{For Y-axis geophone}$$

The Y-axis geophone is rotated by 90 degrees relative to the X-axis geophone in a right hand coordinate system (note FIG. 3B), and the corresponding coil displacements or eccentricities are graphically shown in FIG. 16B for different angles of tilt of the sensor package. Accordingly, it is possible to determine the orientations, i.e., relative bearings, of the X-axis and Y-axis by measuring the coil displacements or tilt of the corresponding geophones.

FIG. 17 is a schematic depiction of one exemplary technique for adjusting the position of a moving coil 12 of a geophone 10 to correct for coil eccentricity. An adjustment mechanism may be built into a geophone for purposes of adjusting or correcting coil eccentricity as shown in FIG. 17. The mechanism of FIG. 17 has a screw 40 and shaft 42 associated with a spring holder 21 of the moving coil spring 20. By adjusting the screw 40 the shaft 42 moves the spring holder 21, the spring 20 and the associated moving coil 12 so that moving coil eccentricity can be corrected. In this, the techniques described herein may be used to test a geophone for coil eccentricity. When coil eccentricity is observed, for example, during the manufacturing process, the moving coil may be adjusted using a device such as depicted in FIG. 17, for example, to correct the eccentricity after fabrication of the geophone.

Generally, the techniques disclosed herein may be implemented on software and/or hardware. For example, they can be implemented in an operating system kernel, in a separate user process, in a library package bound into network applications, on a specially constructed machine, or on a network interface card. In one embodiment, the techniques disclosed herein may be implemented in software such as an operating system or in an application running on an operating system.

A software or software/hardware hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device. Referring now to FIG. 18, a network device 60 suitable for implementing various aspects of the present techniques includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, calculating the geophone moving coil eccentricity, calculating the geophone response parameter values, performing geophone tilt determination operations, etc. The CPU 62 preferably accomplishes all these functions under the control of software including an operating system (e.g. Windows XP), and any appropriate applications software.

CPU 62 may include one or more processors 63 such as a processor from the Motorola or Intel family of microprocessors, or the MIPS family of microprocessors. In an alternative embodiment, processor 63 is specially designed hardware for controlling the operations of network device 60. In another embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc. The interfaces 68 are typically provided as interface cards (sometimes referred to as "line cards"). Generally, they control the sending and receiving of data packets over the network, and sometimes support other peripherals used with the network device 60, such as, for example, display devices 70 and/or printing devices 72. It will be appreciated that the various techniques of the present disclosure may generate data or other information to be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 18 illustrates one specific network device, it is by no means the only network device architecture on which the present disclosure can be implemented. For example, an architecture having a single processor that handles communications as well as routing computations, etc. is often used. Further, other types of interfaces and media could also be used with the network device. Regardless of the network device's configuration, it may employ one or more memories or memory modules (such as, for example, memory block 65) configured to store data, program instructions for the general-purpose network operations and/or other information relating to the functionality of the techniques described herein. The program instructions may control the operation of an operating system and/or one or more applications, for example. The memory or memories may also be configured to store data structures, seismic logging information, geophone response parameter information, prospecting information, and/or other specific non-program information described herein.

Because such information and program instructions may be employed to implement the systems/methods described herein, the present disclosure also relates to machine readable media that, include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The present disclosure may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

The various aspects of the disclosure were chosen and described in order to best explain the principles of the invention and its practical application. The preceding description is intended to enable those of skill in the art to best utilize the invention in various embodiments and aspects and with modifications as are suited to the particular use contemplated. It is intended that the scope of the invention be defined by the following claims.

What is claimed is:

1. A system for determining coil eccentricity of one or more seismic sensor configured or designed for use in seismic signal detection, comprising:
    at least one seismic sensor, comprising:
        a housing;
        at least one magnet for creating a magnetic field mounted within the housing;
        a moving coil mounted within the housing;
        at least one spring assembly connected to the housing and the moving coil for supporting the moving coil for transduction within the magnetic field;
    a digital signal processor in communication with the seismic sensor;
    a set of instructions executable by the processor that, when executed:
        applies to the moving coil of the at least one seismic sensor a direct electrical current such that the moving coil is dislocated from a neutral position relative to the magnetic field in the seismic sensor;
        monitors a predetermined indicator relative to the dislocation of the coil from the neutral position; and
        determines eccentricity of the coil ($\delta$) relative to the center of the magnetic filed using the predetermined indicator.

2. A system for determining coil eccentricity of one or more seismic sensor according to claim 1, wherein the at least one seismic sensor is configured for positioning on one of on land, within a borehole and at a seabed.

3. A system for determining coil eccentricity of one or more seismic sensor according to claim 1, further comprising an adjustment mechanism for adjusting or correcting the eccentricity of the moving coil.

4. A system for determining coil eccentricity of one or more seismic sensor according to claim 1, wherein the set of instructions, when executed, further performs a step test after dislocating the moving coil from the neutral position.

5. A system for determining coil eccentricity of one or more seismic sensor according to claim 1, wherein the system is configured or designed for quality control (QC) activities during manufacture of the at least one seismic sensor.

6. A system for determining coil eccentricity of one or more seismic sensor according to claim 1, wherein the system is configured or designed for monitoring one or more of:
    an amplitude of a response signal of the at least one seismic sensor based on natural oscillation of the moving coil of the seismic sensor;
    a sound caused by the moving coil colliding with an end of the seismic sensor;
    a waveform that is generated by contact of the moving coil with an end of the seismic sensor; and
    total harmonic distortion (THD) of a signal output from the at least one seismic sensor.

* * * * *